United States Patent [19]
Lew et al.

[11] Patent Number: 5,591,923
[45] Date of Patent: *Jan. 7, 1997

[54] ELECTROIC FILTER FOR FLOWMETERS WITH COMPOUND CONTROLS

[76] Inventors: Hyok S. Lew; Yon S. Lew; Hyon S. Lew, all of 7890 Oak St., Arvada, Colo. 80005

[*] Notice: The term of this patent shall not extend beyond the expiration date of Pat. No. 5,435,188.

[21] Appl. No.: 488,603

[22] Filed: Jun. 8, 1995

Related U.S. Application Data

[63] Continuation of Ser. No. 270,820, Jul. 5, 1994, Pat. No. 5,435,188, which is a continuation-in-part of Ser. No. 113, 197, Aug. 30, 1993, Pat. No. 5,351,556, and a continuation-in-part of Ser. No. 848,291, Mar. 9, 1992, Pat. No. 5,309, 771, and a continuation-in-part of Ser. No. 164,925, Dec. 10, 1993, Pat. No. 5,419,189.

[51] Int. Cl.$^6$ ..................................................... G01F 1/32
[52] U.S. Cl. .................................................... 73/861.22
[58] Field of Search ......................... 73/861.21, 861.22, 73/861.23, 861.24, 861.34, 861.18; 328/137, 138, 140, 167; 307/520, 522, 524

[56] References Cited

U.S. PATENT DOCUMENTS

| | | | |
|---|---|---|---|
| 3,522,449 | 8/1970 | McMurtrie | 328/154 |
| 3,747,025 | 7/1973 | Iten et al. | 328/167 |
| 4,270,391 | 6/1981 | Herzl | 73/861.22 |
| 4,934,194 | 6/1990 | Itoh et al. | 73/861.22 |
| 4,966,040 | 10/1990 | Ohmae | 73/861.22 |

Primary Examiner—Richard Chilcot
Assistant Examiner—Harshad Patel

[57] ABSTRACT

An electronic filter for conditioning a primary flow signal including alternating electrical signals generated in a flowmeter comprises a parallel bank of low frequency bandpass filters and high frequency bandpass filters, wherein the switching on or off of the individual low frequency bandpass filter is controlled by a command signal generated from an auxiliary flow signal provided by an accessory flowmeter supplying a crude but stable signal representing the level of fluid flow, and the switching on and off of the individual high frequency bandpass filters is controlled by a command signal generated from the frequency of the primary flow signal providing a highly accurate and extremely sensitive signal that represents the time rate of fluid flow.

20 Claims, 10 Drawing Sheets

ELECTROIC FILTER FOR FLOWMETERS WITH COMPOUND CONTROLS

This patent application is Continuation Application to patent application Ser. No. 08/270,820 entitled "Electronic Filter for Flowmeters with Compound Controls" filed on Jul. 05, 1994, now U.S. Pat. No. 5,435,188, which application is a Continuation-In-Part Application to application Ser. No. 08/113,197 filed on Aug. 30, 1993 that is now U.S. Pat. No. 5,351,556 that had been filed as a Continuation-In-Part to application Ser. No. 07/848,291 filed on Mar. 09, 1992, now U.S. Pat. No. 5,309,771 and to patent application Ser. No. 08/164,925 filed on Dec. 10, 1993, now U.S. Pat. No. 5,419,189.

FIELD OF INVENTION

This invention relates to an electronic filter with compound controls conditioning a primary flow signal such as an alternating or fluctuating electrical signal provided by a flowmeter, which primary flow signal is converted to the flow rate of media moving through the flowmeter by a data processor, which electronic filter with compound controls comprises a parallel bank of filters including a plurality of upper range filters conditioning the primary flow signal in the upper range of flow rate and a plurality of lower range filters conditioning the primary flow signal in the low range of flow rate of media, wherein the upper range filters conditioning the primary flow signal sensitively and accurately representing the flow rate of media are controlled by the frequency or magnitude of the primary flow signal, while the low range filters are controlled by the frequency or amplitude of an auxiliary flow signal approximately and insensitively representing the flow rate of media.

BACKGROUND OF INVENTION

With few exceptions, all prior arts teaching the construction and operation of a parallel bank of electronic filters for conditioning electrical signals in flowmeters, particularly vortex flowmeters, employ the well known and routinely practiced feedback method to control the switching of a plurality of filters included in the parallel bank of filters. In other words, the output of the parallel bank of filters is fed back to a filter control device switching on and off the individual filters included in the parallel bank of filters in such a way that only one individual filter best suited to selectively transmit the flow signal excluding the noise is switched on one at a time. Generally, the above-described feedback method controlling the switching of individual filters included in the parallel bank of filters does not work in conditioning the flow signal of very low amplitude such as an alternating electrical signal generated by vortex shedding at very low velocities of fluid flow or in a high noise environment where the noise signals are dominant in frequency or amplitude because the parallel bank of filters controlled by the feedback command signal locks on to the noise signal created by mechanical vibrations of the vortex flowmeter body rather than on the weaker vortex signal The parent patent application Ser. No. 08/113,197 discloses a compound electronic filter that overcomes the problem and difficulty existing with the prior arts, in which compound electronic filter the switching of individual filters included in a parallel bank of filters is controlled by a command signal generated by the frequency of the alternating electrical signal detected at the input end of the parallel bank of filters instead of the output end thereof wherein the alternating electrical signal providing the command signal is filtered by a parallel bank of a few prefilters controlled by a command signal generated by the frequency of the alternating electrical signal detected at the output end of the prefilters.

BRIEF SUMMARY OF INVENTION

The primary object of the present invention is to provide an electronic filter with compound controls conditioning a primary flow signal comprising an alternating electrical signal generated in determining the flow rate of a flowmeter such as a vortex shedding flowmeter, that comprises a parallel bank of filters consisting of one or more upper range filters and one or more lower range filters, which combination of individual filters may include one or more middle range filters, wherein the upper range filters are controlled by a command signal generated from the frequency of the primary flow signal measured at an input side of the parallel bank of filters, and the lower range filters of the parallel bank of filters are controlled by a command signal generated from an auxiliary flow signal generated by an accessory flow-indicating device such as a flow switch or a crude secondary flowmeter. The accessory flow-indicating device may be a mechanical flow switch comprising a flap or other fluid dynamic target or device discretely or continuously indicating a few preset flow rates, or a thermal or electromagnetic device crudely indicating the levels of flow rate in a discrete or continuous manner. It must be understood that the primary flow signal accurately and sensitively represents the flow rate of media moving through the flowmeter and is vulnerable to contamination by the noise created by mechanical vibration as in the case of the alternating electrical signal generated by the vortex shedding phenomenon in the vortex flowmeters, while the auxiliary flow signal discretely or continuously represents the flow rate of media only in an approximate and reliable manner and is immune to the noise generated by mechanical vibration as in the case of a single or multiple position flow switch operating on the principles of fluid dynamic loading, or a crude fluid dynamic rotary device, or an inexpensive convective heat transfer device. It must be further understood that the electronic filter comprising the parallel bank of filters conditions the primary flow signal that determines the flow rate of media, which primary flow signal also provides the command signal controlling the upper range filters and/or the middle range filters. The auxiliary flow signal is used only to generate the command signal controlling the low range filters. Each of the individual filters making up the electronic filter of the present invention has a finite bandwidth and each pair of adjacent individual filters have bandwidths over-lapping one another at the boundary therebetween in a steeply decaying manner. An individual command signal switching on an individual filter included in the parallel bank of filters represents the median frequency of the bandwidth of the particular individual filter and, consequently, the particular individual filter selectively transmits an alternating electrical signal with frequencies distributed about the median frequency of the bandwidth of the particular filter. Of course, the filter control system turns on one individual filter at one time, and the lowest filter remains switched on when all other filters are switched off. The individual command signals respectively switching the individual high range filters are generated by the frequency of the primary flow signal detected at the input or output side of the parallel bank of filters, and the individual command signals respectively switching the individual middle range filters are generated by the frequency of the primary flow signal detected at the output side of the parallel bank of filters when the parallel bank of filters includes the middle range filters, while the individual command signals respectively switching the individual low range filters are generated by the amplitude or frequency of the auxiliary flow signal that is produced by a crude and reliable device detecting various preset levels of the flow rate for the sole purpose of controlling the individual low range filters. The auxiliary flow signal may also be used to switch on and off the primary flow signal output cut-off switch whereby the output from the parallel bank of filters is cut-off when the level of flow rate represented by the auxiliary flow switch is less than a preset minimum value, whereby the primary flow signal indicates zero value when the flow rate is less than the preset minimum value. The use of the auxiliary flow signal immune to contamination by the noise generated by mechanical vibrations provides a much more reliable command signal for controlling the low range filters compared with the command signal generated by the primary flow signal vulnerable to the noise that easily switches a wrong filter on when the flow rate is very low and generates a very weak primary flow signal.

Another object is to provide the electronic filter with compound controls described in the primary object of the present invention-that includes only the low and high range filters wherein the high range filters are controlled by a command signal generated from the frequency of the primary flow signal detected at the input side of the parallel bank of filters.

A further object is to provide the electronic filter with compound controls described in the primary object of the present invention that includes only the low and high range filters wherein the command signal controlling the high range filters are generated from the frequency of the primary flow signal detected at the output side of the parallel bank of filters.

Yet another object is to further condition the primary flow signal already conditioned by the electronic filter with compound controls described in the primary object of the present invention by a second stage filter comprising a parallel bank of filters controlled by a command signal generated from the frequency of the primary flow signal detected at the output side of the electronic filter with compound controls and at the input side of the second stage filter, wherein the electronic filter with compound controls and the second stage filter are disposed in a series relationship.

Yet a further object is to condition the primary flow signal by a primary filter comprising a plurality of individual filters controlled by a command signal generated from the frequency of the primary flow signal detected at the output side of the electronic filter with compound controls described in the primary object of the present invention, wherein the electronic filter with compound controls is employed to generate the command signal controlling the primary filter that conditions the primary flow signal.

Still another object is to provide the electronic filter with compound controls described in the primary object of the present invention, wherein the parallel bank of filters has an over-ride control system backing up the regular control system using the command signal generated from the primary and auxiliary flow signals, which over-ride control system switches on and off the individual electronic filters in a sweep or scanning mode when the level of the auxiliary flow signal is greater than zero or a preset minimum value and the level of the output alternating electrical signal from the parallel bank of filters is equal to zero or less than a preset minimum value, and turns off the switching in the sweep or scanning mode as soon as the level of the output alternating electrical signal from the parallel bank of filters becomes greater than zero or the preset minimum value, whereupon the regular control system using the command signal generated from the primary and auxiliary flow signals takes over.

Still a further object is to condition the primary flow signal by using the electronic filter with compound controls as described in the afore-mentioned various objects of the present invention wherein an output cut-off switch cuts off the output primary flow signal determining the flow rate when the amplitude of the output flow signal is less than a preset minimum value, or the frequency of the output flow signal is less than a preset minimum value, or the level of the auxiliary flow signal is less than a preset minimum value, whereby the flowmeter registers zero flow velocity instead of a nonzero, false flow velocity when the flow velocity falls below a threshold velocity, below which threshold velocity the flowmeter is not able to measure the flow velocity accurately and reliably.

These and other objects of the present invention will become further clear as the description of the inventions progresses.

BRIEF DESCRIPTION OF FIGURES

The present inventions may be described with a greater clarity and specificity by referring to the following figures.

DESCRIPTION OF ILLUSTRATED EMBODIMENTS

Figure 1:
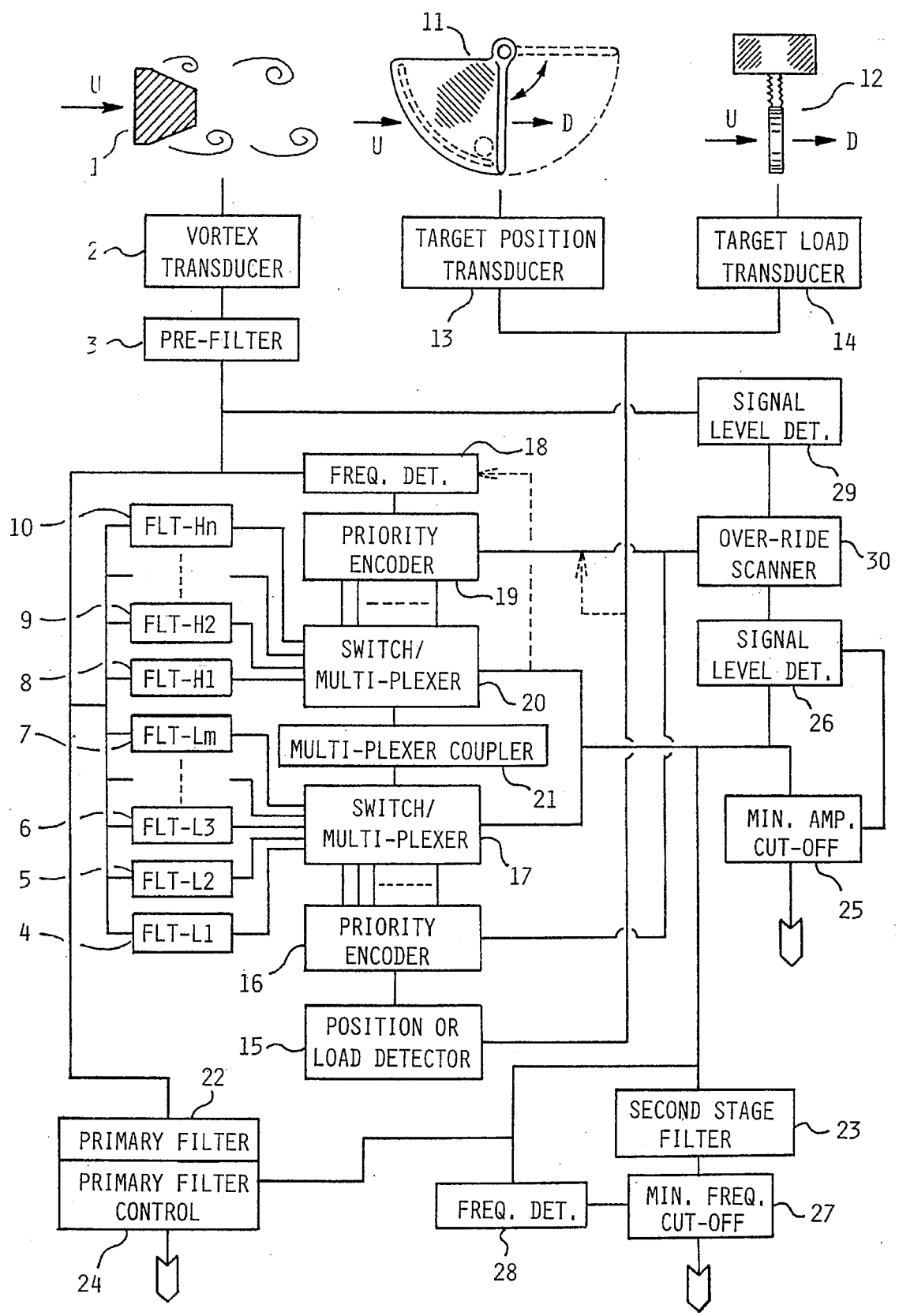
FIG. 1 illustrates a flow diagram showing the operating method and principles of a generalized version of the electronic filter with compound controls of the present invention used in conjunction with a second stage filter or a primary filter.

In FIG. 1 there is illustrated a flow diagram of an embodiment of the electronic filter with compound controls conditioning a primary flow signal generated in the form of an alternating electrical signal by a vortex shedding flowmeter that operates on the method and principles of the present invention. It should be understood that the present invention works with other types of flowmeters such as turbine or paddle flowmeters and magnetic flowmeters, while the most important application is in conditioning the vortex signals generated by vortex flowmeters. This embodiment of the electronic filter with compound controls includes not only the absolutely necessary circuit elements required to condition the primary flow signal but also the accessorial circuit elements complementing the conditioning of the flow signal. The primary flow signal generated by the vortex shedding in a vortex flowmeter by fluid passing over a vortex generating bluff body 1 and detected by a vortex transducer 2 is preconditioned by a prefilter 3 which consists of either a low pass filter or a bandpass filter before being put into the electronic filter with compound controls of the present invention comprising a parallel bank of filters, which includes a parallel combination of a plurality of low frequency bandpass filters 4, 5, 6, 7, etc. and a plurality of high frequency bandpass filters 8, 9, 10, etc. This combination of the low and high frequency bandpass filters covers the entire range of the vortex frequency range as the bandwidths of adjacent individual bandpass filters over-lap one another at frequencies distributed about the boundary frequency between the adjacent filters in a sharply decaying manner and, consequently, the parallel combination of individual filters 4 through 10 continuously covers the full range of the vortex shedding frequencies. The vortex signal generated by the vortex transducer 2 is called the primary flow signal, because the flow rate of fluid under measurement is determined as a function of the frequency of the vortex signal. An auxiliary flow signal is generated in the form of a non-oscillating or oscillating electrical signal by an accessory flowmeter such as a flow switch included in the embodiment shown in FIG. 4, or a drag-type target flowmeter included in the embodiments shown in FIGS. 1 and 2, or a thermal flowmeter or turbine flowmeter included in FIG. 3. The accessory or secondary flowmeter generates the auxiliary flow signal generally lacking the accuracy, reliability, and resolution in the flow measurement provided by the primary flow signal such as the vortex-generated alternating electrical signal, but has a high immunity to the noise created by the mechanical vibrations other than the vortex shedding. It is well known fact that the vortex shedding phenomena occurs in air flows as low as a few feet per second and in water flows as low as a fraction of a foot per second. However, the noise generated by mechanical virbrations such as the structural vibration of the flowmeter body and the fluid mechanical vibration of sources other than the vortex shedding and entrained in the vortex-generated alternating electrical signal, e.g., the primary flow signal, makes it very difficult to readily detect the vortex-generated signal at the above-mentioned low flow rates. In earlier inventions made by the inventors of the present invention, which are described in the parent patent U.S. Pat. No. 5,309,771 and in the parent patent application Ser. No. 08/113,197, a very clever and highly effective electronic filters for conditioning the vortex-generated signal were disclosed, which comprises a parallel bank of individual filters controlled by a command signal generated from the frequency of the vortex-generated signal detected at an input side of the parallel bank of individual filters. While the electronic filters controlled by the command signal generated from the frequency of the primary flow signal works very well in measuring flow rates equal to or greater than air flows of 4.5 feet per second and water flows of 0.5 feet per second in environments with low to medium level mechanical vibrations, such an electronic filter does not work in measuring very low flow rates, e.g., air flow of 2 to 4 feet per second and water flow of 0.3 to 0.5 feet per second under extremely noisy and vibratory ambient conditions because the command signal controlling the parallel bank of filters is generated by the frequency of the noise signal instead of the frequency of the vortex signal in such low flow ranges and, consequently, the electronic filter locks onto the noise signal instead of the vortex signal.

The genius and unorthodoxy in the present invention is to control the low frequency bandpass filters 4, 5, 6, 7, etc covering the lower portion of the flow range, where the flow signal is weak and fails to boom above the noise, by a command signal generated from the amplitude or frequency of the auxiliary flow signal totally or virtually immune to the structural or fluid dynamic vibration. For example, the auxiliary flow signal representing the position of or loading on a fluid dynamic target, or the degree of convective cooling of a heating element immersed in the fluid stream, or the rotary speed of a turbine or paddle, is not effected at all by any mechanical vibration. Of course, the high frequency bandpass filters 8, 9, 10, etc. are controlled by the command signal generated by the frequency of the primary flow signal detected either at the input or output end side of the parallel bank of individual filters 4 through 10. It should be understood that, in an alternative embodiment working under an extremely noisy and/or vibratory environment such as an airplane engine fuel flowmeter, air speed indicator for subsonic aircraft and helicopters, etc., the entire individual filters may be controlled by the command signal generated from the auxiliary flow signal provided by a continuously indicating flow switches or by a crude but highly reliable accessory or secondary flowmeter. The pivotable fluid dynamic target 11 or the fixed position fluid dynamic target 12 reacts to the same fluid passing over the vortex generating bluff body 1 and provides the auxiliary flow signal representing the pivotal position of the target flowmeter 11 or the fluid dynamic loading on the target flowmeter 12. The target position transducer 13 or 14 generates the auxiliary flow signal from the position of or the loading on the target flowmeter. A position or load detector 15 generates a dc command signal from the auxiliary flow signal and sends it to the priority encoder 16 which has a plurality of threshold voltages respectively corresponding to a plurality of threshold frequencies respectively assigned to a plurality of switches included in the switch/multiplexer 17, which plurality of switches respectively switch on and off the plurality of low frequency bandpass filters 4, 5, 6, 7, etc. When the command dc voltage generated by the position or load detector 15 and sent to the priority encoder 16 is equal to or greater than a threshold voltage assigned to the adjacent higher frequency low frequency bandpass filter, that particular low frequency bandpass filter becomes switched on and stays switched on as long as the command dc voltage remains within the range of that filter's bandwidth threshold voltages, whereby the primary flow signal with frequencies distributed within the bandwidth of the particular low frequency bandpass filter is selectively transmitted through the particular low frequency bandpass filter. As a consequence the lowest low frequency bandpass filter 4 becomes switched on when the command dc voltage generated by the position or load detector 15 is equal to or greater than the threshold voltage assigned thereto or zero, and less than the threshold voltage assigned to the next lowest low frequency bandpass filter 5, and the next lowest low frequency bandpass filter 5 becomes switched on when the command dc voltage is equal to or greater than the threshold voltage assigned thereto and less than the threshold voltages assigned to the third lowest low frequency bandpass filter 6, and so on. The priority encoder 16 allows only one individual low frequency bandpass filter to switch on and switches off all of the rest of the individual low frequency bandpass filters. Of course when the command dc voltage generated by the position or load detector 15 is equal to zero or less than a preset threshold voltage assigned to the lowest low frequency bandpass filter, there will be no output from the parallel bank of filters and zero flow will be indicated instead of a false flow signal created by the ambient mechanical vibrations which may appear on the output of the lowest low frequency bandpass filter 4. The plurality of high frequency bandpass filters 8, 9, 10, etc. are controlled by a command dc voltage generated by the frequency detector 18 that detects the frequency of the primary flow signal generated by the vortex transducer 2 and preconditioned by the pre-filter 3, where the command dc voltage generated by the frequency detector 18 is processed by another priority encoder 19 which operates the switching on and off of the high frequency bandpass filters 8, 9, 10, etc. by means of the switch/multiplexer 20 by the same method as that controlling the switching of the low frequency bandpass filters 4, 5, 6, 7, etc. with one exception being that the command dc voltage controlling the high frequency bandpass filters 8, 9, 10, etc. is generated from the frequency of the primary flow signal detected at the input or output side of the parallel bank of filters, while the command dc voltage controlling the low frequency bandpass filters 4, 5, 6, 7, etc. is generated from the auxiliary flow signal detecting the position of or loading on the target-flowmeter or flow sensing member 13 or 14. The multiplexer coupler 21 performs a function that ensures that only one individual bandpass filter among the high frequency and low frequency bandpass filters 4, 5, 6, 7, 8, 9, 10, etc is switched on at one time and all of the remaining individual bandpass filters are switched off, and/or additional functions such that when no flow is detected by the flow target or flow sensing member 13 or 14, all individual bandpass filters are switched off to avoid false flow indications created by ambient mechanical vibrations, or that the selection of an individual bandpass filter 8, 9, 10, etc. in the high frequency range is made only if the command dc voltage generated from the auxiliary flow is equal to or greater than a preset value. It should be understood that the bandwidth of each individual bandpass filter included in the plurality of both low frequency and high frequency bandpass filters of the parallel bank of filters extends beyond the range bounded by two threshold frequencies respectively corresponding to two threshold voltages defining the switch-on range of the particular individual bandpass filter and, consequently, the entire range of the vortex shedding freqencies is continuously covered by the bandwidths of the individual bandpass filters constituting the electronic filter in a partially over-lapping relationship between each pair of adjacent bandwidths.

The single most important feature of the electronic filter with compound controls constructed in accordance with the principles of the present invention is that the command dc voltage controlling the low frequency bandpass filters 4, 5, 6, 7, etc. included in the parallel bank of filters is generated from the auxiliary flow signal that may not be accurate and reliable enough to determine the flow rate therefrom, but which is immune to contamination by the noise signal, while the command dc voltage controlling the high frequency bandpass filters 8, 9, 10, etc. also included in the parallel bank of filters is generated from the frequency of the primary flow signal that is highly accurate and reliable, but which is vulnerable to contamination by the noise signal. It should be understood that, in general, it is very difficult to measure the vortex shedding frequency occurring at very low flow velocities, e.g., air flow under the standard condition lower than 15 feet per second or 5 meters per second, and water flow lower than 2 feet per second or 0.7 meters per second, without conditioning the primary flow signal generated by vortex shedding by using a low frequency bandpass filter with a narrow bandwidth, because the noise signal created by mechanical vibrations of the vortex flowmeter body and entrained in the primary flow signal has frequencies higher than the vortex shedding frequencies at low flow rates. If only a frequency detector is used to generate the command dc voltage, the frequency detector will lock onto the high frequency of the noise signal instead of the low frequency of the vortex signal. As a consequence, when the command dc voltage generated by the frequency of the primary flow signal is used to control the individual bandpass filters included in the parallel bank of filters, a wrong individual filter assigned to a high frequency range is switched on instead of the right individual filter assigned to a low frequency range designed to condition the vortex signal at the lower portion of the vortex sheddding frequency spectrum. The present invention teaches a unique and ingenious solution to the afore-mentioned problem by employing an auxiliary flow signal which generates a command dc voltage that controls the plurality of low frequency bandpass filters 4, 5, 6, 7, etc. in a manner immune to accidental locking onto the noise signal entrained in the primary flow signal and suppressing the selection of a high frequency bandpass filter 8, 9, 10, etc. unless the auxiliary flow signal indicates high flow. Therefore, even high noise conditions will not affect the correct selection of a low frequency bandpass filter assigned to a low frequency range of the vortex signal. It should be understood that, in a high frequency range, the vortex signal is overwhelmingly larger than the noise signal and, consequently, the command signal can be generated from the frequency of the primary flow signal detected at the input or output side of the parallel bank of filters 4 through 10 without worrying about the noise signal entrained in the primary flow signal generating a wrong command signal. The electronic filter with compound controls including the parallel bank of filters 4 through 10 can be employed without any other electronic filter or filters in conditioning the primary flow signal determining the flow rate of fluid media, or may be employed in conjunction with a primary filter 22 or with a second stage filter 23, which additional electronic filters 22 or 23 may have a construction illustrated in FIG. 5 or 8 with some modification in the source of the comma signal. In the combination with the primary filter 22, the electronic filter with compound controls comprising the parallel bank of filters 4 through 10 does not actually condition the primary flow signal, as the actual conditioning of the primary flow signal is performed by the primary filter 22 having operating principles and structures similar to that shown in FIGS. 5 or 6, wherein the frequency detector included in the control 24 of the primary filter 22 takes the frequency information from the output of the electronic filter with compound controls comprising the parallel bank of filters 4 through 10 instead of from the input to the embodiment of the primary filter shown in FIG. 5 or instead of from the output from the embodiment of the primary filter shown in FIG. 8 in controlling the low frequency bandpass filters. In the combination with the second stage filter 23, the electronic filter with compound controls comprising the parallel bank of filters 4 through 10 functions as a first stage filter and actually conditions the primary flow signal that is also conditioned by the second stage filter employing the two structural embodiments shown in FIGS. 5 or 8, wherein the output from the electronic filter with compound controls included in the embodiment shown in FIG. 1 is input to the second stage filter comprising the embodiment shown in FIGS. 5 or 8. As a matter of fact, all of the parallel bank of filters included in the embodiments shown in FIGS. 1, 2, 3, 4, 5 and 8 have the same operating principles and substantially identical constructions, but have different sources of the command signals.

In order to prevent a vortex flowmeter from registering a false value of the flow velocity in a low flow range wherein the noise signal is greater than the vortex signal, a minimum amplitude cut-off circuit 25 may be included in the output side of the electronic filter with compound controls, or that of the second stage filter or of the primary filter in the case where such additional filters are employed, wherein the minimum amplitude cut-off circuit 25 cuts off the output flow signal when the amplitude of the output signal measured by a signal level detector 26 falls below a preset minimum value that may be adjusted in the field according to the noise level existing in the specific working enviroment. A minimum frequency cut-off circuit 27 may be included at the output end of the filter assembly in place of or in series with the minimum amplitude cutoff circuit 25, which automatically cuts off the output flow signal when the frequency of the output flow signal measured by the frequency detector 28 falls below a preset minimum value, below which preset minimum value the vortex signal and the noise signal become indistinguishable from one another. The preset minimum value of the output flow signal that determines the minimum measurable flow velocity, may also be adjusted in the field in accordance with the noise level existing in the specific working environment. The minimum amplitude and minimum frequency cut-off circuits 25 and 27 included independently or in a series combination are accessory elements, which are not essential components of the electronic filter with compound controls.

An over-ride control system comprising the signal level detectors 26 and 29 and an over-ride scanner 30 may be included in order to ensure that the switching on and off of the parallel bank of filters 4 through 10 is executed in the mode tracking the varying flow velocity, which over-ride control system automatically takes over the switching of the parallel bank of filters 4 through 10 when the level of the primary flow signal measured by the primary flow signal level detector 29 taken at the input side of the electronic filter with compound controls is greater than a preset minimum value and the amplitude of the primary flow signal detected by the signal level detector 26 taken at the output side of the electronic filter with compound controls is less than a preset minimum value. The over-ride scanner 30 puts out a series of ramp dc voltage starting with zero value and ending with a maximum value equal to or greater than the largest threshold voltage assigned to the highest frequency bandpass filter that commands the priority encoders 16 and 19 to switch on and off the parallel bank of filters 4 through 10 one at a time starting with the lowest low frequency bandpass filter and ending with the highest high frequency bandpass filter, which switching in the sweep or scanning mode is continued until the signal level detector 26 detects the output flow signal having a level equal to or greater than the preset minimum value, at which point, the over-ride control system is deactivated allowing the regular control system generating the command dc voltage from the primary and/or auxiliary flow signal to take over. It should be noticed that the entire frequency range of the vortex shedding can controlled by the command dc voltage generated solely from an auxiliary flow signal provided by a multiple position flow switch or from continuous position flow switch or switches, thereby doing away with the use of the primary flow signal for controlling the upper range of filters in the parallel bank of filters, as the plurality of bandpass filters included in the parallel bank of filters 4 through 10 are now controlled entirely by the command signal generate, from the auxiliary flow signal.

Figure 2:
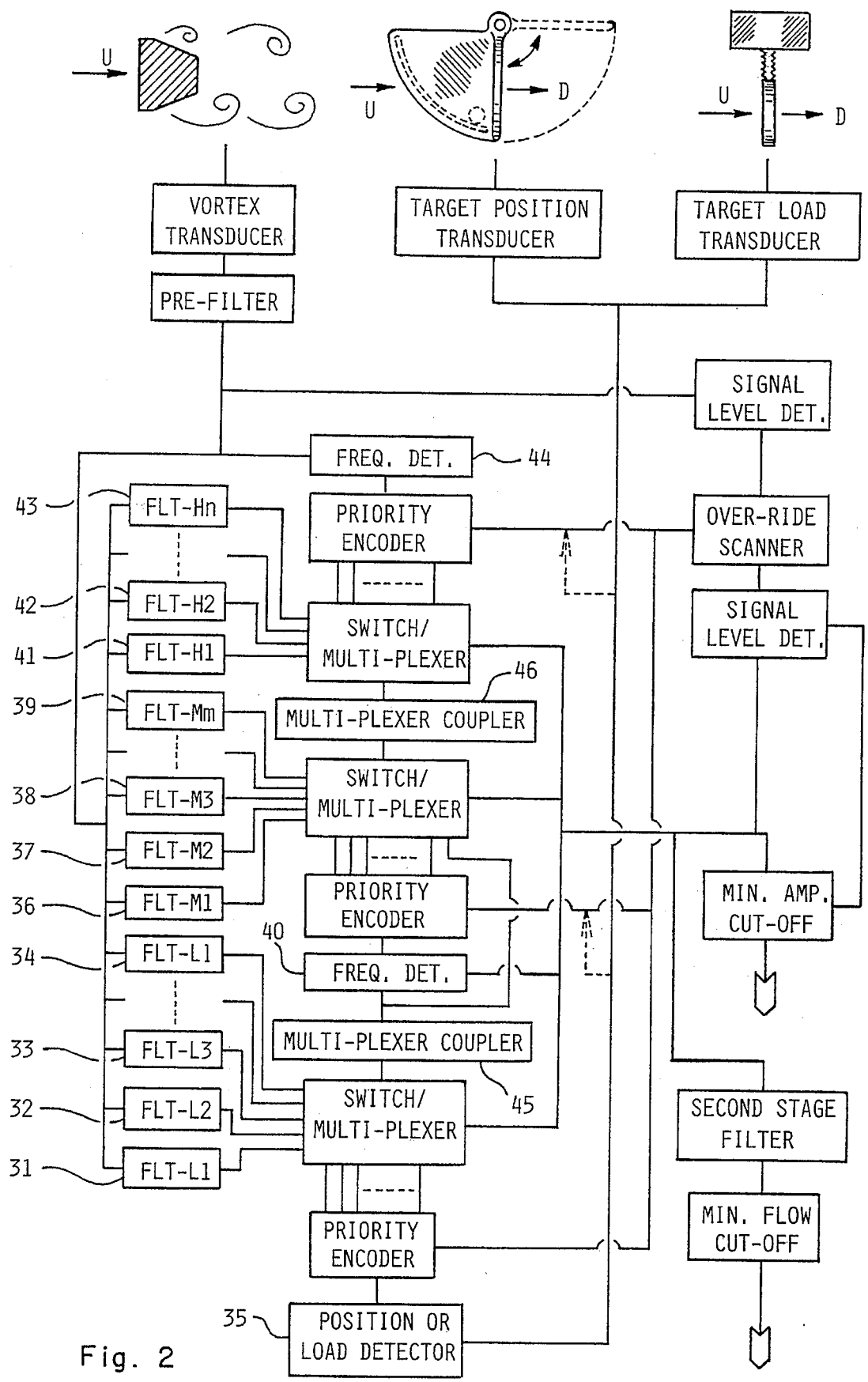
FIG. 2 illustrates a flow diagram showing the operating method and principles of the electronic filter with compound controls with an upper range, a middle range, and a lower range of filters, that is used in conjunction with a second stage filter.

In FIG. 2, there is illustrated another embodiment of the electronic filter with compound controls, that is a modified version of the embodiment shown in FIG. 1 and operates on the same principles as those described in FIG. 1. While the embodiment of the electronic filter with compound controls shown in FIG. 1 comprises a parallel bank of the low frequency bandpass filters controlled by the command signal generated from the auxiliary flow signal, and the high frequency bandpass filters controlled by the command signal generated from the frequency of the primary flow signal detected at either the input or output side of the electronic filter with compound controls the embodiment shown in FIG. 2 comprises a parallel bank of low frequency bandpass filters 31, 32, 33, 34, etc. controlled by the command signal generated from the auxiliary flow signal provided by the position or load detector 35, middle frequency bandpass filters 36, 37, 38, 39, etc. controlled by the command signal generated from the frequency of the primary flow signal detected by a frequency detector 40 at the output side of the electronic filter and the high frequency bandpass filters 41, 42, 43, etc. controlled by the command signal generated from the frequency of the primary flow signal detected by a frequency detector 44 at the input side of the electronic filter with compound controls. The multiplexer couplers 45 and 46 interlink the three different filter control systems respectively controlling the low, middle, and high frequency bandpass filters and ensures that only one of the individual filters is switched on at one time.

Figure 3:
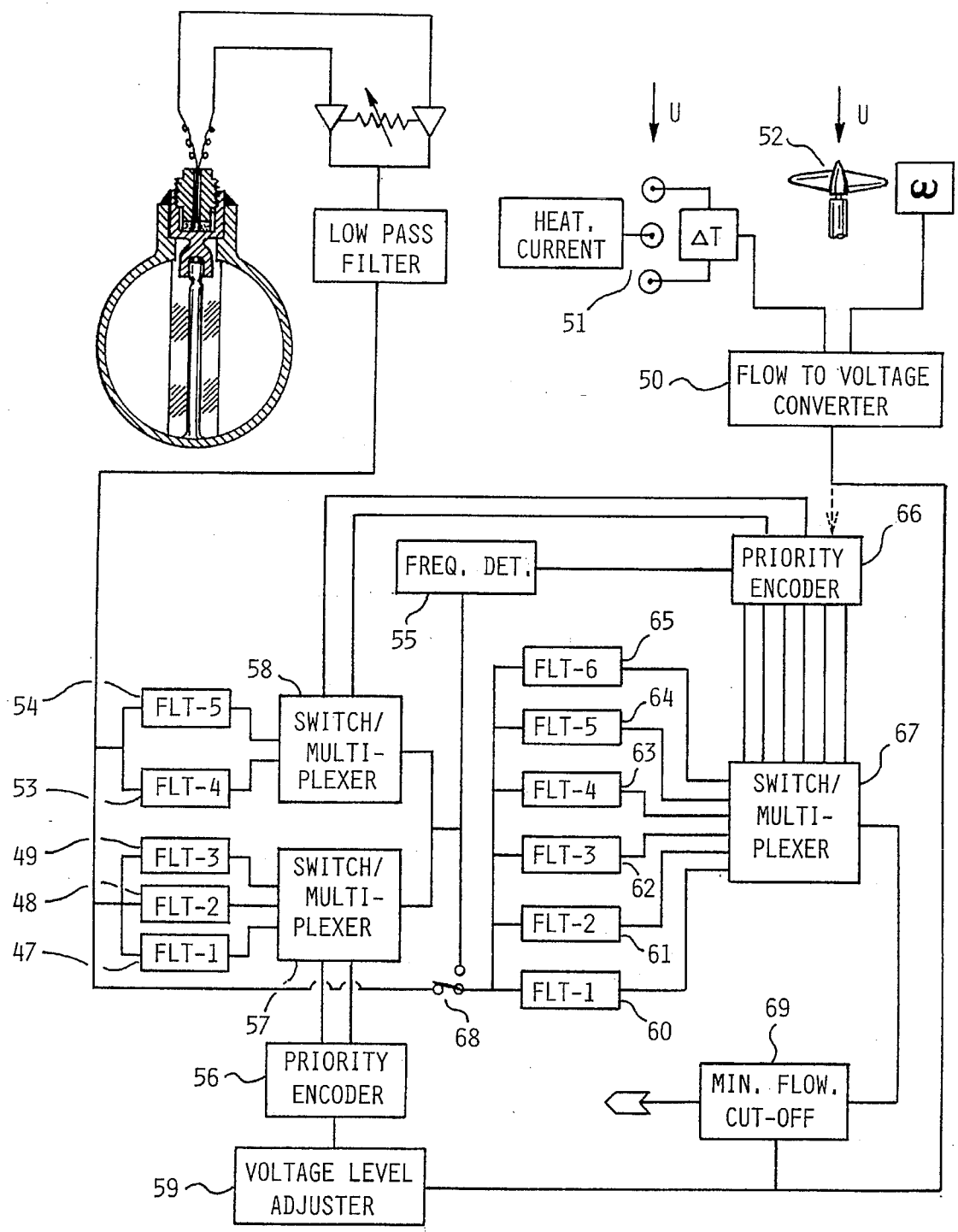
FIG. 3 illustrates a flow diagram showing the operating method and principles of a simplified and economized version of the electronic filter with compound controls used as a first stage filter in conjunction with a second stage filter.

In FIG. 3 there is illustrated an embodiment of the electronic filter with compound controls, that is a simplified and economized version of the embodiment shown in FIG. 1. This particular embodiment includes the electronic filter with compound controls operating on the principles described in conjunction with FIG. 1 as a first stage filter that is employed in conjunction with the primary filter or the second stage filter as shown in FIG. 1. The first stage filter comprises a parallel bank of low frequency bandpass filters 47, 48, and 49 controlled by the command signal generated from the auxiliary flow signal provided by a flow to voltage converter 50 that may include a multi-position flow switch, or a thermal flow indicator 51, or a turbine or paddle flowmeter 52, and high frequency bandpass filters 53 and 54 controlled by the command signal generated from the frequency of the primary flow signal detected by a frequency detector 55 at the output side of the first stage filter. The control of the low, and high frequency bandpass filters are respectively executed by the combination of the priority encoder 56 and the switch/multiplexer 57 and the switch/multiplexer 58. It should be noticed that the control of the two high frequency bandpass filters 53 and 54 does not require a priority encoder because the control logic ensures that one is on when the other is off and vice versa. When the low frequency bandpass filters included in the first stage filter has two filters instead of the three as shown in the particular embodiment, the priority encoder 56 can be omitted. The voltage level adjuster 59 sets the level of the control voltage supplied by the flow to voltage converter 50 to a desired level in such a way that the control voltages respectively switching on the three low frequency bandpass filters 47, 48, and 49 have progressively higher values in such a way that the highest value thereof is lower than the control voltage switching on the lower high frequency bandpass filter 53 as shown in FIG. 3, whereby the individual filters are sequenced corresponding to the flow rates of increasing value. It is readily recognized that the voltage level adjuster setting the voltage level of the command signal generated from the auxiliary flow signal to lower levels in comparison with the control signal generated from the frequency of the primary flow signal is a simple example of the switch-multiplexer couplers included in the embodiments shown in FIGS. 1 and 2. The primary or second stage filter receiving the output signal from the first stage filter comprises a parallel bank of bandpass filters 60 through 65, which bandpass filters are controlled by the command signal generated from the frequency of the primary flow signal detected by the frequency detector 55 by means of the combination of the priority encoder 66 and the switch/multiplexer 67. The filter control selection switch 68 makes it possible to operate the embodiment shown in FIG. 3 as a combination of the electronic filter with compound controls and the primary filter as shown by the particular switch position, wherein the electronic filter with compound controls merely provides the command signal controlling the primary filter while the second stage filter performs actual conditioning of the flow signal, or as a combination of the first and second stage filters when the switch 68 is flipped over to the other position, wherein the first and second stage filters are put into a series circuit conditioning the primary flow signal at two stages. The minimum flow cut-off circuit 69 cuts the output flow signal determining the flow rate of fluid media, when the level of the flow represented by the level of the auxiliary flow signal falls below a preset minimum value, thereby ensuring that the output flow signal registers zero flow independent of the level of noise entrained in the output flow signal when the flow rate is actually zero or has a very low value. Of course, the minimum flow cut-off circuit 69 switches on when the flow level represented by the auxiliary flow signal becomes greater than the preset minimum value. In an alternative design, the minimum flow cut-off circuit 69 can be omitted, and the minimum flow cut-off system can be included into the combination of the priority encoder 66 and the switch/multiplexer 67, wherein a command signal generated from the auxiliary flow signal is employed to switch on and off the lowest low frequency bandpass filter 60 when the level of the afore-mentioned command signal exceeds and falls below a preset minimum value, which lowest low frequency bandpass filter would remain switched on when all other bandpass filters become switched off in a system that does not have the minimum flow cut-off switching.

Figure 4:
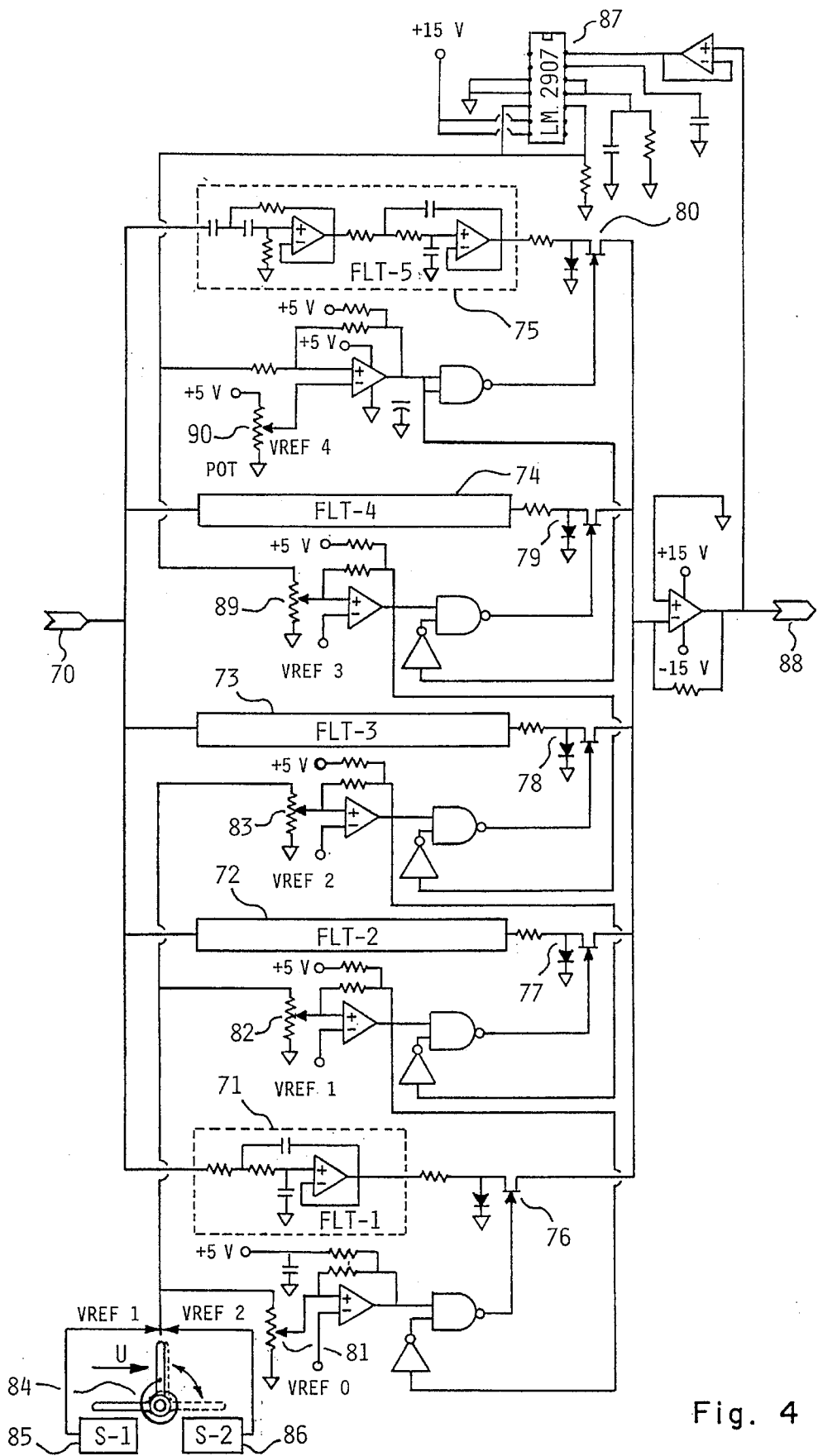
FIG. 4 illustrates a structural embodiment of the electronic filter with compound controls functioning as a first stage filter in the embodiment shown in FIG. 3.

In FIG. 4 there is illustrated a structural embodiment of the electronic filter with compound controls, that can be employed as a first stage filter in the embodiment shown in FIG. 3. The input primary flow signal preconditioned by a prefilter such as a low pass filter or bandpass filter without any automated control system is supplied to the input side 70 of a parallel bank of low frequency bandpass filters 71, 72 and 73, and high frequency bandpass filters 74 and 75, wherein the lowest low frequency bandpass filter 71 may be a low pass filter. The individual filters 71 through 75 are respectively switched on and off by a plurality of JFET switches 76 through 80 constituting the switch/multiplexer included in the embodiments shown in FIGS. 1, 2 and 3. The switching of the JFET switches 76, 77 and 78 controlling the low frequency bandpass filters 71, 72 and 73 is controlled by the comparators 81, 82 and 83 constituting the priority encoder included in the embodiments shown in FIGS. 1, 2 and 3. The individual comparators receive the command signal generated by a two position flow switch 84 including two flaps with a 90 degree angle therebetween and pivotally disposed with a spring bias in such a way that the flap is kept at a position whereat a first proximity switch 85 is closed and a second proximity switch 86 is open, when the flow rate of fluid media is less than a first threshold value, at which position of the flap the two position flow switch 84 supplies a dc voltage greater than VREF0 and less than VREF1 and VREF2 to the comparators 81, 82 and 83, and only the lowest low frequency bandpass filter 71 remains switched on. When the flow rate is greater than the first threshold value and less than a second threshold value, the fluid dynamic force rotates the flap of the flow switch to an intermediate position wherein both proximity switches 85 and 86 are open, at which position of the flap the flow switch 84 supplies a dc voltage greater than VREF1 and less than VREF2 to the comparators 81, 82 and 83, and only the medium low frequency bandpass filter 72 is switched on. When the flow rate exceeds the second threshold value, the flap of the flow switch becomes rotated to a position shown by the broken lines whereat only the second proximity switch 86 is closed and the flow switch 84 supplies a dc voltage greater than VREF2 to the comparators 81, 82 and 83, under which condition only the highest low frequency bandpass filter 73 is switched on. The high frequency bandpass filters 74 and 75 are controlled by a frequency-to-voltage converter 87 that detects the frequency of the flow signal at the output side 88 of the parallel bank of filters, and converts to a dc voltage that is supplied to the comparators 89 and 90 respectively controlling the JFET switches 79 and 80. When the flow rate is greater than a third threshold value and less than a fourth threshold value, the frequency-to-voltage converter supplies a dc voltage greater than VREF3 and less than VREF4 to the comparators 89 and 90, whereupon only the lower high frequency bandpass filter 74 is switched on. When the flow rate exceeds the fourth threshold value, the frequency-to-voltage converter 87 supplies a dc voltage greater than VREF4 to the comparators 89 and 90, and only the higher high frequency bandpass filter 75 is switched on. It should be notices that the VREF's of the plurality of comparators 81 through 90 are variable whereby they can be set to values in a progressively increasing order and tuned to the characteristics of the primary flow signal to obtain the maximum conditioning thereof. It is clear that only one of the plurality of filters 71 through 75 becomes switched on at one time, and all other filters stay switched off, because of the inter-coupling of the controls of the JFET switches 76 through 80. It is not difficult to incorporate the following additional features into the electronic filter with compound controls shown in FIG. 4: The output side of the frequency-to-voltage converter 87 may include a switch controlled by the proximity switch 86 of the three position flow switch 84 in such a way that the high frequency bandpass filters 74 or 75 can be switched on only if the flap of the flow switch 84 is fully rotated to the position shown by the broken lines and the proximity switch 86 is closed. Instead of the two position flow switch 84, a three position flow switch may be employed wherein the three positions respectively switch on and off all of the three low frequency bandpass filters 71, 72 and 73 whereby the switching off of the lowest low frequency bandpass filter 71 cuts off any noise transmitted through the paralled bank of filters when the flow rate is less than a preset minimum value. Of course, the same end result can be obtained with the two position flow switch 84, when the filter 71 is omitted and the bandwidth of the two remaining low frequency bandpass filters 72 and 73 are adjusted to cover the entire low end of the vortex frequency spectrum. It should be understood that, in an alternative embodiment, the frequency-to-voltage converter 87 can be omitted, and the flow switch 84 can be replaced with a continuous position target flowmeter or by a thermal flow sensor that generates the command signal controlling all of the filters 71 through 75.

Figure 5:
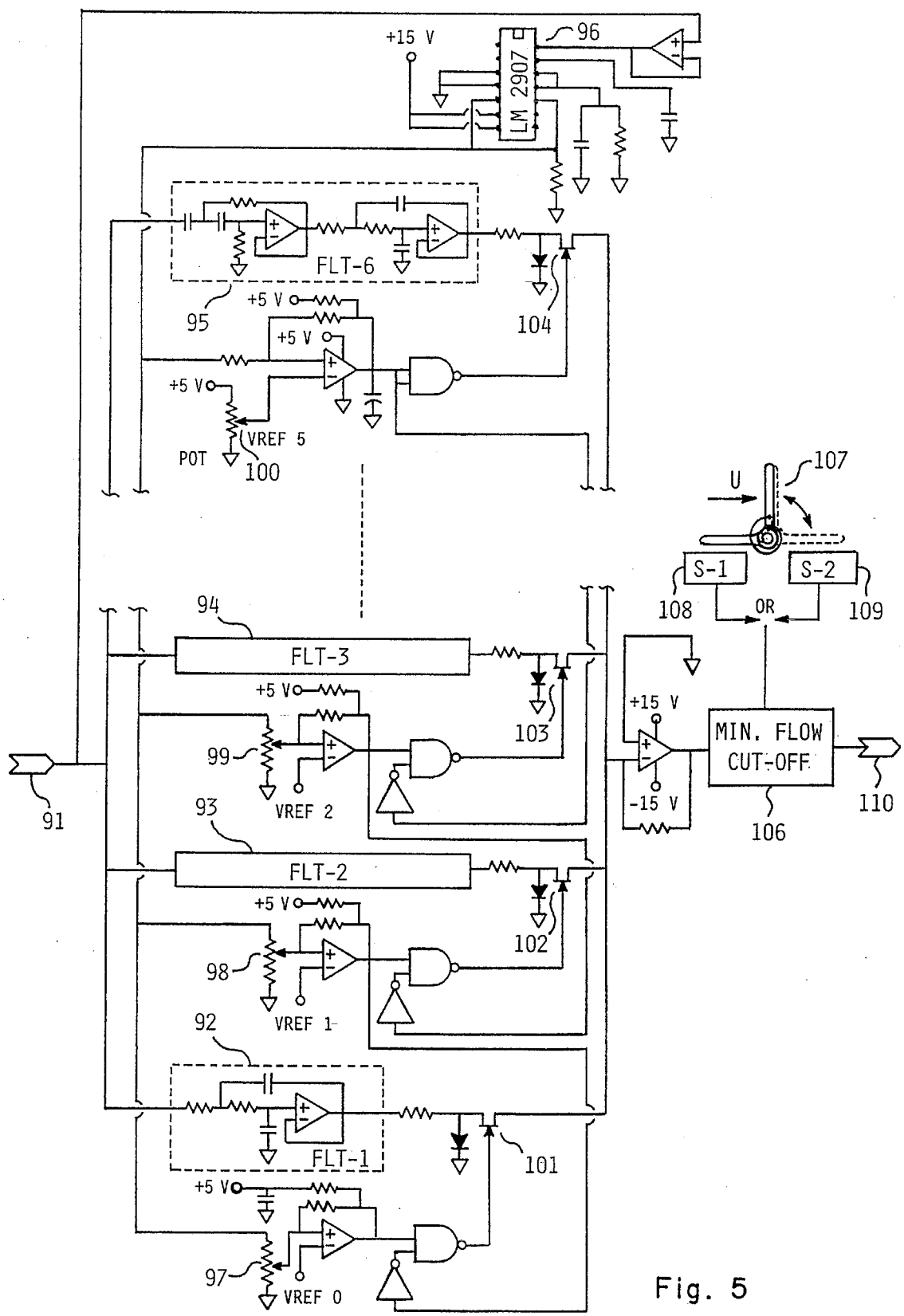
FIG. 5 illustrates a structural embodiment of the second stage filter that can be disposed in series relationship with the electronic filter with compound controls as shown in FIG. 4, which series combination includes a flow switch cutting off the output primary flow signal when the flow rate falls below a measurable minimum value.

In FIG. 5 there is illustrated a structural embodiment of the electronic filter with single control, that can be employed as the second stage filter included in the embodiment shown in FIG. 3. The primary flow signal conditioned by the electronic filter with compound controls such as the embodiment shown in FIG. 4 is supplied to the input side 91 of the parallel bank of filters 92, 93, 94, 95, etc. which cover the entire range of the vortex shedding frequencies, which individual filters are controlled by the command signal provided by the frequency-to-voltage converter 96 that detects the frequency of the primary flow signal at the input side of the parallel bank of filters and converts it to a dc voltage. The command dc voltage supplied to the comparators 97, 98, 99, 100, etc. controls the switching of the JFET switches 101, 102, 103, 104, etc. in switching on and off the individual filters 92, 93, 94, 95, etc. on the same principles as those described in conjunction with FIG. 4. When the electronic filter with single control shown in FIG. 5 is used as the primary filter included in the embodiment shown in FIG. 3, the frequency-to-voltage converter 96 takes the frequency of the primary flow signal at the output side of the first stage filter included in the embodiment shown in FIG. 3, and the primary flow signal preconditioned by a prefilter is supplied in a parallel arrangement to the electronic filter with compound controls shown in FIG. 4 and the primary filter with single control shown in FIG. 5, wherein the output flow signal from the primary filter is used to determine the flow rate of fluid media. While the minimum flow cut-off circuit system can be built into the control of the lowest low frequency bandpass filter included in the parallel bank of filters used as the second stage filter or the primary filter included in the embodiment shown in FIG. 3 as shown and described in conjunction with FIG. 3, a separate minimum flow cut-off circuit 106 controlled by a single position flow switch 107 including either one of the two proximity switches 108 or 109 can be included at the output end 110 of the parallel bank of filters. The flow switch 107 with two flaps separated by 90 degrees is pivotally disposed about an axis approximately coinciding with the line of intersection between the two flaps, which flaps have a spiral bias spring that keeps a first of the two flaps at a close proximity to a proximity switch 108 in the absence of the fluid flow exceeding a preset minimum value, at which position the proximity switch 108 supplies a command signal switching off the minimum cutoff circuit 106. As soon as the flow rate exceeds the minimum preset value, the flap pivots away from the proximity switch 108 and the proximity switch 108 sends another command signal switching on the minimum flow cut-off circuit 106. In place of the proximity switch 108, a proximity switch 109 may be employed, that switches on the minimum flow cut-off circuit 106 when the flap is rotated to a close proximity thereto and switches off the minimum flow cut-off switch 106 when the flap moves away therefrom. The bias force provided by the bias spiral spring countering the fluid dynamic torque on the flaps of the flow switch 107 may be adjusted in the field, whereby the minimum measurable flow rate can be set in the field in accordance with the noise level existing in the specific working environment.

Figure 6:
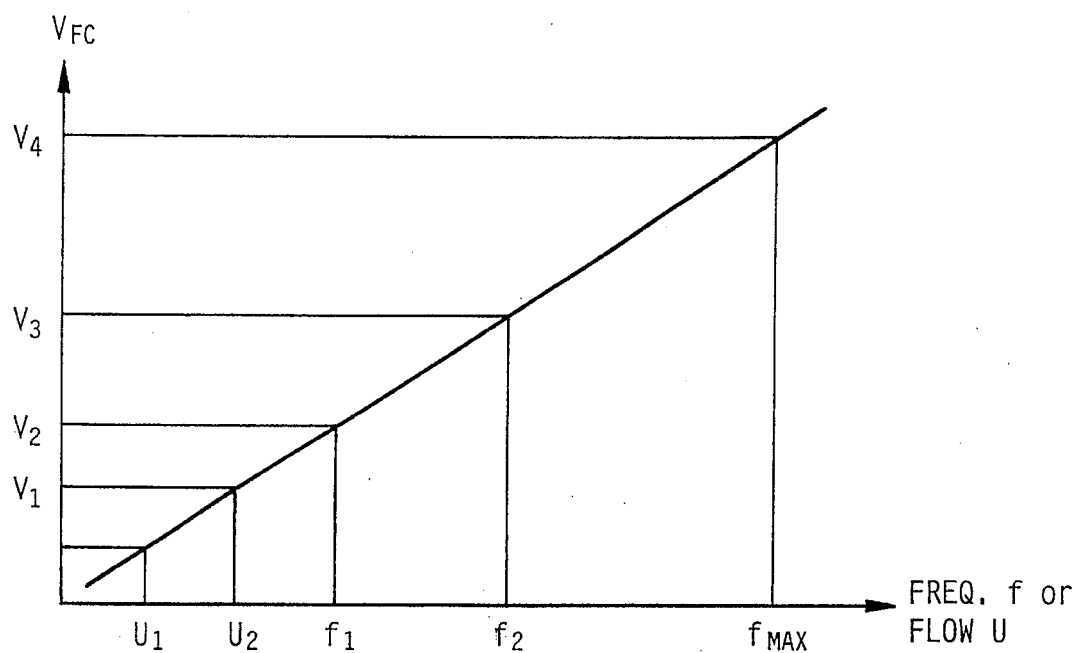
FIG. 6 illustrates the principles of control switching on and off of the individual electronic filters assembled in a parallel relationship, which constitute the electronic filter with compound controls.

In FIG. 6 there is illustrated a relationship between the flow U of the fluid generating the auxiliary flow signal and the frequency f of the primary flow signal, and the command signal $V_{FC}$ generated from the auxiliary flow signal and the primary flow signal, which command signal $V_{FC}$ controls the switching of the individual bandpass filters included in a parallel bank of filters shown in FIG. 4. The low frequency range of the plurality of bandpass filters have bandwidths respectively defined by the intervals bounded by zero and $U_1$, $U_1$ and $U_2$, and $U_2$ and $f_1$. The plurality of comparators controlling the switching of the low frequency range of bandpass filters have the threshold voltage values VREF respectively equal to 0 or the preset minimum value, $V_1$, and $V_2$. The high frequency range of the plurality of bandpass filters have bandwidths respectively defined by the intervals $f_1$ and $f_2$, $f_2$ and $f_{max}$. The plurality of comparators controlling the switching of the high frequency range of bandpass filters have the threshold values VREF respectively equal to $V_3$, $V_4$, etc. It is readily realized that, for example, when the flow rate is in the range bounded by $U_2$ and $f_1$, and generates the primary flow signal with a frequency falling within the bandwidth of the next to lowest low frequency bandpass filter, the comparator and/or the command signal generator are adjusted in such a way that the command signal dc voltage is in the range bounded by $V_1$ and $V_2$, and consequently, the next to lowest low frequency bandpass filter is switched on, while all other remaining bandpass filters remain switched off. As a consequence, a component of the primary flow signal representing the vortex shedding is selectively transmitted through the next to lowest low frequency bandpass filter included in the electronic filter with compound controls, while all other components with frequencies different from the vortex shedding frequencies are blocked off, even if there are noise signal dominant in frequency and amplitude. Therefore the electronic filter with compound controls blocks off even dominant noise and selectively transmits the vortex signal buried under the noise entrained in the primary flow signal. As flow increases, the primary flow signal becomes dominant over all noise signals present, and a high frequency bandpass filter selectively transmitting the vortex signal while rejecting all noise signals with frequencies different from the frequency of vortex shedding becomes automatically switched on.

Figure 7:
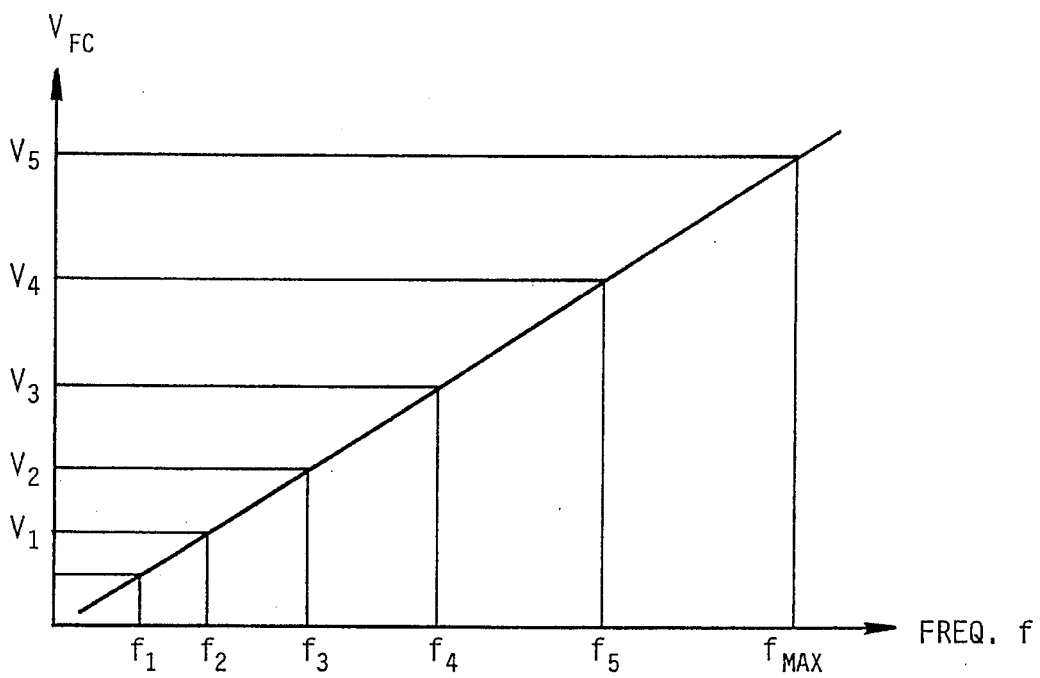
FIG. 7 illustrates the principles of control switching on and off of the individual electronic filters included in the primary filter or second stage filter included in the combination shown in FIGS. 1, 2, or 3.

In FIG. 7 there is illustrated a relationship between the frequency f of the primary flow signal and the command signal $V_{FC}$ generated by the frequency of the primary flow signal and controlling the individual filters included in the parallel bank of filters shown in FIG. 5. The individual bandpass filters have bandwidth respectively defined by the intervals between two adjacent frequencies 0, $f_1$, $f_2$, $f_3$, $f_4$, $f_5$ and $f_{max}$. The plurality of comparators have threshold voltage values VREF respectively equal to 0, $V_1$, $V_2$, $V_3$, $V_4$ and $V_5$. It is readily recognized that, for example, when the frequency of the primary flow signal is in the range bounded by $f_1$, $f_2$ that is equal to the bandwidth of the lowest low frequency filter, the comparators and/or the command signal generator are adjusted in such a way that the command signal dc voltage is in the range bounded by 0 and $V_1$ and, consequently, the lowest low frequency filter is switched on while all other remaining filters are switched off.

Figure 8:
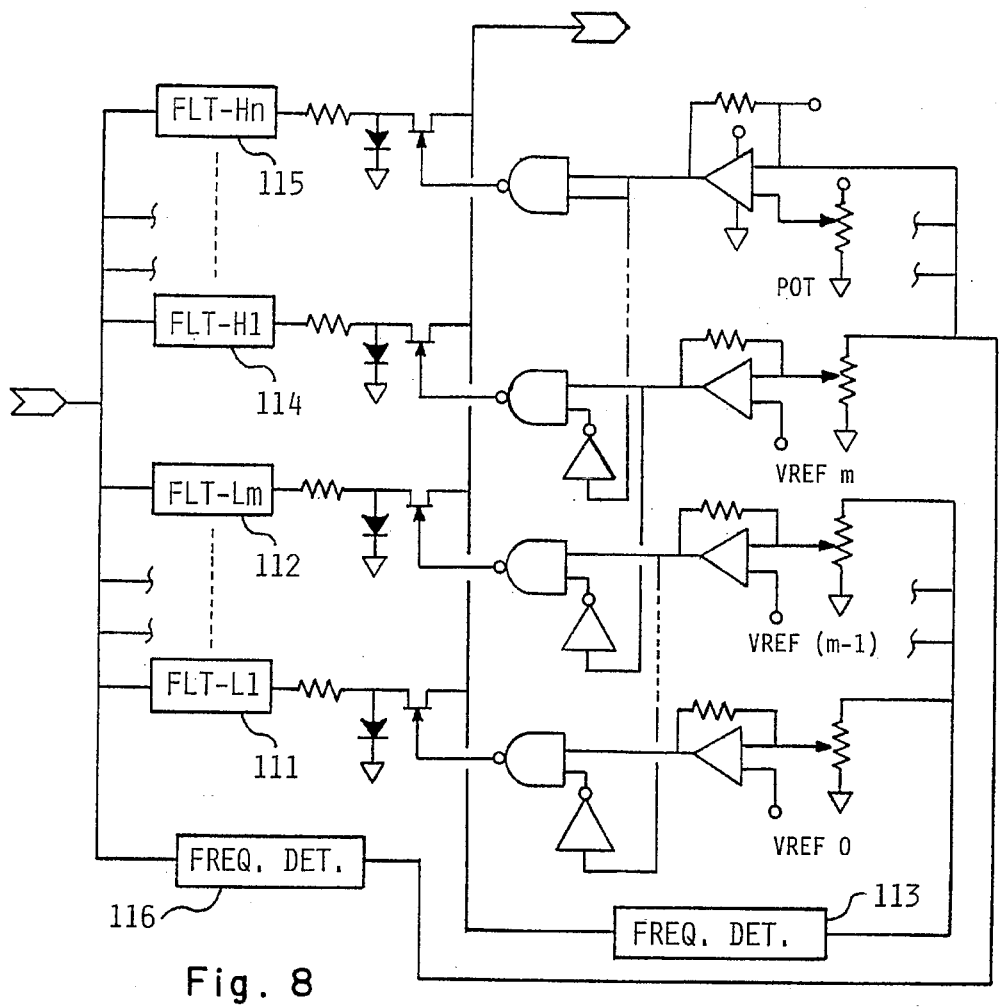
FIG. 8 illustrates a structural embodiment of a parallel bank of filters that can be used as a primary filter or second stage filter employed in conjunction with the electronic filter with compound controls, or that can be used in place of the combination of filters 4 and 5 employed in the embodiment shown in FIG. 4 in constructing an embodiment of the electronic filter with compound controls.

In FIG. 8 there is illustrated a structural embodiment of a parallel bank of filters, that can be used as the combination of the middle frequency bandpass filters 36, 37, 38, 39, etc. and the high frequency bandpass filters 41, 42, 43, etc. disposed in a parallel relationship with the low frequency bandpass filters 31, 32, 33, 34, etc. in constructing the embodiment of the electronic filter with compound controls shown in FIG. 2, or as the second stage filter or primary filter employed in the embodiment shown in FIG. 3. This particular embodiment of the electronic filter with simple control comprises a parallel bank of the low frequency bandpass filters 111, 112, etc. controlled by a command signal generated from a frequency of the primary flow signal measured by a frequency detector 113 at the output side of the parallel bank of filters, and high frequency bandpass filters 114, 115, etc. controlled by a command signal generated from the frequency of the primary flow signal measured by a frequency detector 116 at the input side of the parallel bank of filters. It should be understood that the low frequency bandpass filters 111, 112, etc. corresponds to the middle frequency bandpass filters 36, 37, 38, 39, etc. included in the embodiment shown in FIG. 2, when this particular parallel bank of filters is used in a parallel relationship to the low frequency bandpass filters 31, 32, 33, 34, etc. included in the embodiment shown in FIG. 2 in constructing the electronic filter with compound controls.

Figure 9:
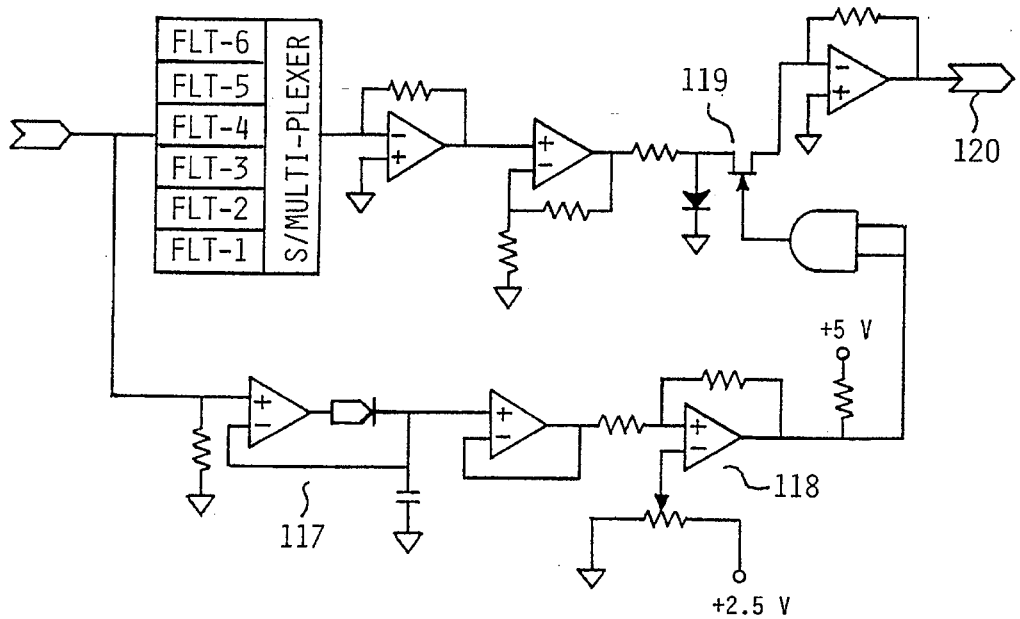
FIG. 9 illustrates a structural embodiment of the amplitude cut-off switch that cuts off the output flow signal from a parallel bank of filters when the amplitude of the output flow signal is less than a preset minimum value.

In FIG. 9 there is illustrated a structural embodiment of the minimum amplitude cut-off circuit. The signal level detector 117 detects the level of the primary flow signal at the input side of the parallel bank of filters, and a comparator 118 compares the level of the primary flow signal with a preset minimum. When the level of the primary flow signal is less than the preset minimum value stored in the comparator 118, the comparator 118 switches off the JFET switch 119, thereby cutting off the output flow signal 120. By presetting the minimum value equal to a value corresponding to the minimum measurable velocity of fluid, the vortex flowmeter is tuned in such a way that it measures fluid velocities equal to or greater than the preset minimum value and registers zero value when the fluid velocity is less than the preset minimum value.

Figure 10:
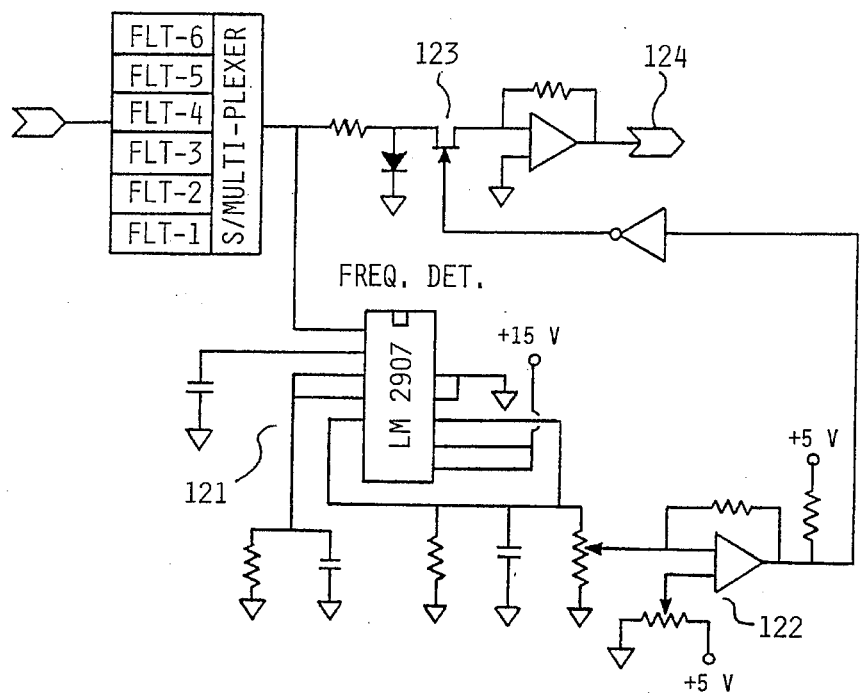
FIG. 10 illustrates a structural embodiment of the frequency cut-off switch that cuts off the output .flow signal from a parallel bank of filters when the frequency of the output flow signal is less than a preset minimum value.

In FIG. 10 there is illustrated a structural embodiment of the minimum frequency cut-off circuit. The frequency detector 121 detects the frequency of the output flow signal at the output side of the parallel bank of filters, which frequency is converted to a dc voltage and sent to a comparator 122. When the dc voltage generated by the frequency of the output flow signal falls below a preset minimum value stored in the comparator 122, the comparator 122 switches off the JFET switch 123 cutting off the output flow signal 124. By presetting the minimum value equal to a value corresponding to the minimum measurable flow velocity, the vortex flowmeter is made to register zero value when the velocity of fluid falls below the minimum measurable velocity. It is generally true that the noise signal has a higher frequency than the frequency of the vortex signal in the lower end of the vortex shedding frequency range and, consequently, the minimum frequency cut-off circuit has a tendency to operate under a false command signal generated by the frequency of the noise signal instead of the frequency of the vortex signal in cutting off the output flow signal. There it is preferred that the minimum amplitude cut-off circuit is employed independently or in conjunction with the minimum frequency cut-off circuit installed in series therewith.

Figure 11:
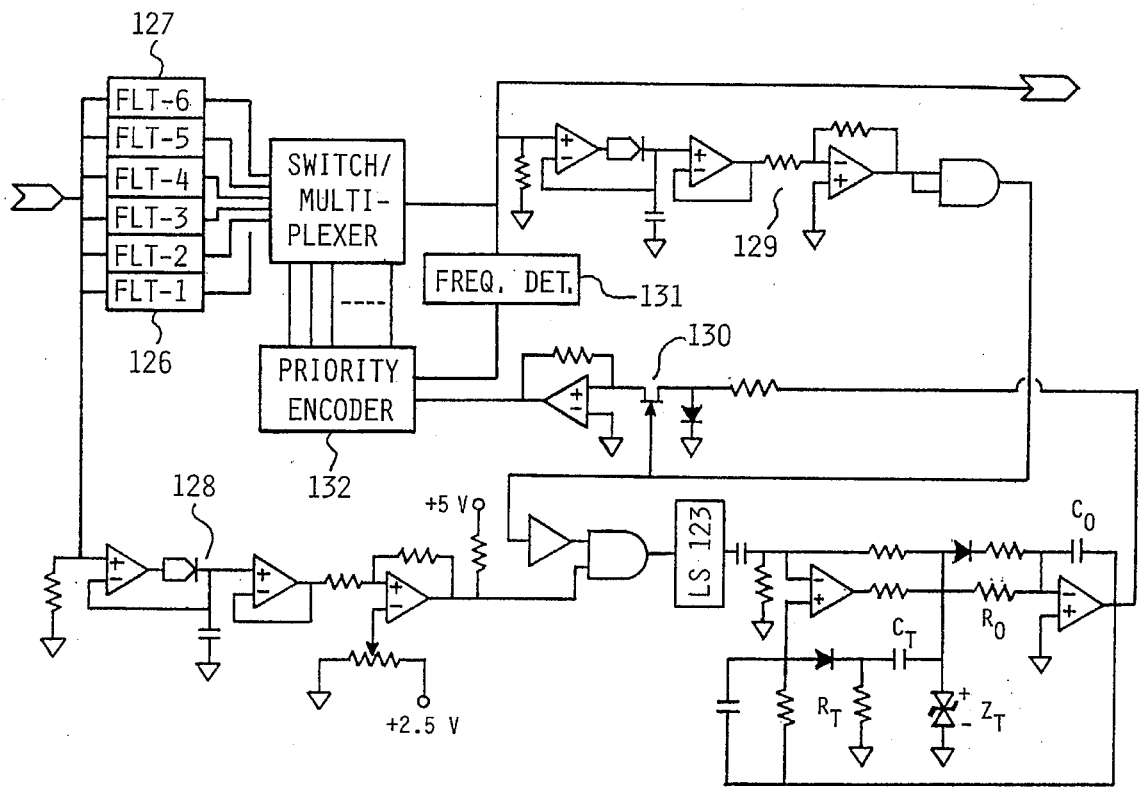
FIG. 11 illustrates a structural .embodiment of the override control system backing up the regular control system switching on and off the plurality of the individual filters included in the electronic filter with compound controls included in the embodiment shown in FIG. 1 or FIG. 2, that switches on and off the individual filters in a sweep or scanning mode when the level of the output flow signal from a parallel bank of filters is less than a preset minimum value, and turns off the switching in the sweep or scanning mode as soon as the level of the output signal becomes equal to or greater than the preset minimum value.

In FIG. 11 there is illustrated a structural embodiment of the override control system providing a backup control means that switches on and off the plurality of bandpass filters included in the parallel bank of filters. A ramp generator 125 generates a series of a ramp voltage increasing from zero or a value equal to the threshold value assigned to the switching of the lowest frequency filter 126 to a maximum value at least equal to or greater than the maximum threshold value assigned to the switching of the highest frequency filter 127, when an input flow signal level detector 128 detects a level of the input flow signal greater than zero or a preset minimum value and an output signal level detector 129 detects a level of the output flow signal equal to zero or less than a preset minimum value. It is evident that such a ramp voltage switches on and off the plurality of filters 126 through 127 one at a time in a sweeping or scanning mode starting with the lowest frequency filter 126 and ending with the highest frequency filter 127, which sequential switching on and off of the individual filters is repeated as long as the output signal level detector 129 fails to detect the output signal level greater than zero or the preset minimum value. As soon as the output signal level detector 129 detects a signal greater than zero or the preset minimum value, a JFET switch 130 shuts off the over-ride control system, whereupon the plurality of filters 126 through 127 are controlled by the command signal generated by the combination of a frequency detector 131 and a priority encoder 132. In the particular illustrative embodiment, the over-ride control system comprising the signal level detectors 128 and 129, and the ramp voltage generator 125 turns on when the input flow signal to the parallel bank of filters 126 through 127 is greater than zero or a preset minimum value and the output flow signal from the parallel bank of filters is equal to zero or less than a preset minimum value, and turns off as soon as the output signal from the parallel bank of filters registers a value greater than zero or the preset minimum value. In a modified version of the particular illustrative embodiment, the signal level detector 128 may be omitted and the control of the ramp voltage generator 125 can be modified in such a way that the ramp voltage generator 125 turns on when the output flow signal level detector 129 does register a signal level equal to zero or less than a preset minimum value, and turns off as soon as the output signal level detector 129 registers a signal level greater than zero or the preset minimum value.

The primary flow signal generated by the vortex shedding in a vortex flowmeter and conditioned by one or more parallel banks of filters is sent to a data processor that is not shown in the illustrative embodiment, which data processor determines the fluid velocity as a function of the frequency of the conditioned form of the output flow signal. The use of the electronic filter with compound controls of the present invention enables a well designed vortex flowmeter to measure air flows under the standard condition as low as 3 feet per second or 1 meter per second and water flows as low as 0.3 feet per second or 0.1 meter per second even under an extremely noisy and vibratory ambient condition.

Figure 12:
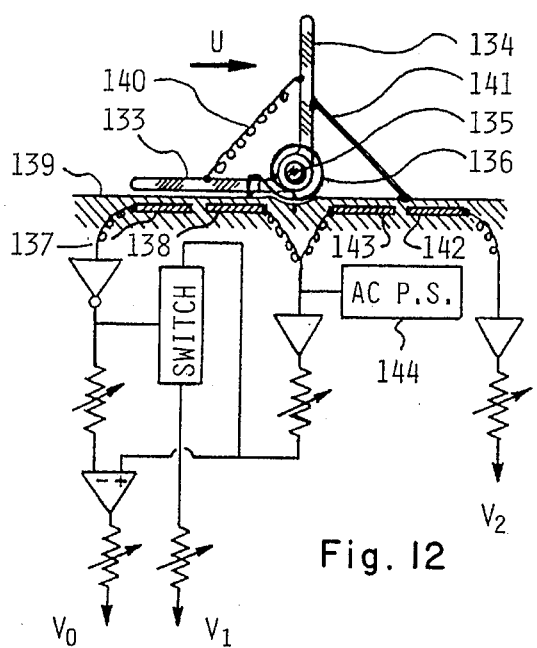
FIG. 12 illustrates a structural embodiment of the multiple position flow switch that provides the auxiliary flow signal controlling the low range filters as well as the output flow signal cut-off switch.

In FIG. 12 there is illustrated an embodiment of the flow switch employing flaps and capacitive proximity switches that can be used to generate the auxiliary flow signal controlling the switching of the low frequency bandpass filters. The flow switch comprises a pair of flaps 133 and 134 pivotally supported about an axis 135 approximately coinciding with the line of intersection between the two flaps 133 and 134, wherein the flap 133 is biased by a spiral spring 136 that keeps the flap 133 at a close proximity to the first capacitive proximity switch comprising a pair of capacitive planar members 137 and 138 disposed on a plane close and parallel to the wall 139 of the flow passage where the fluid media moves at a velocity U. A tension spring 140 biases the two flaps 133 and 134 towards one another, while a flexible tether 141 limits the angle between the plane defined by two capacitive planar members 142 and 143 of the second capacitive proximity switch and the flap 134 to approximately 90 degrees. It should be understood that the bias springs 136 and 140 and the stop tether 141 can be replaced with other forms of well known mechanical hardware providing the same respective end results. In order to electrically interact with the capacitor plates included in the capacitive proximity switches, the flaps 133 and 134 must be made of or lined with an electrically conductive material such as a metal. When the flow rate or the velocity U of the fluid falls below a preset minimum value that can be adjusted by varying the bias torque provided by the bias spiral spring 136, the flaps 133 and 134 take the position shown in FIG. 12, whereat the first proximity switch with capacitor plates 137 and 138 becomes closed and the flow switch puts out a command signal $V_0$ originating from an ac source 144, which action switches off the lowest low frequency bandpass filter included in the embodiment shown in FIG. 4, or the minimum flow cut-off circuit 106 included in the embodiment shown in FIG. 5. When the flow rate of the fluid media increases to a level slightly above the preset minimum value, the drag force on the flap 134 separates the flap 133 away from the pair of capacitor plates 137 and 138, which action switches on the lowest low frequency bandpass filter 71 or the minimum flow cut-off circuit 106 and, consequently, the output flow signal becomes transmitted from the electronic filter with compound controls to a data processor determining the flow rate of fluid media from the frequency and/or amplitude of the flow output signal. When the flow rate rises further and the flap 133 moves further away from the two capacitor plates 137 and 138, the flow switch puts out a command signal $V_1$ that switches on the next to lowest low frequency bandpass filter 72 included in the embodiment shown in FIG. 4. When the flow rate increases to a higher level and the drag force on the flap 134 pivots the flap 134 to a close proximity to the pair of capacitor plates 142 and 143 included in the second proximity switch, the second proximity switch becomes closed and the flow switch puts out a command signal $V_2$ that switches on the highest low frequency bandpass filter 73. When the flow rate increases to an even higher level, one of the high frequency bandpass filters such as the elements 74 and 75 included in the embodiment shown in FIG. 4 becomes switched on depending on the flow rate that generates the command signal from the frequency-to-voltage converter 87 included in the embodiment shown in FIG. 4. The interesting and useful feature of the flow switch shown in FIG. 12 is that both of the two flaps fold into a flat position closely adjacent to a plane defined by the pair of capacitor plates 143 and 144, and consequently, offers a minimum amount of obstruction to the fluid flow at higher velocities.

Figure 13:
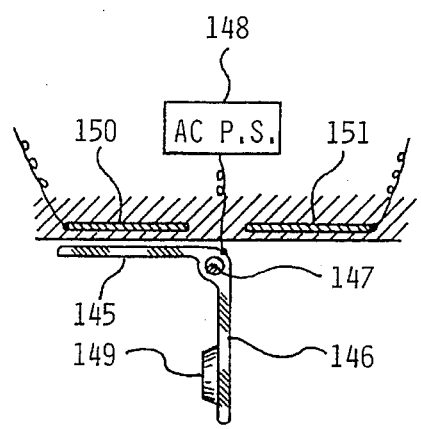
FIG. 13 illustrates another structural embodiment of the flow switch providing the auxiliary flow signal controlling the low range filters as well as the output flow signal cut-off switch.

In FIG. 13 there is illustrated another embodiment of the flow switch comprising two metallic flaps 145 and 146 rigidly connected to one another at a 90 degree angle and pivotally supported about a pivot axis 147 coinciding with the line of intersection between the two flaps 145 and 146, wherein an alternating signal from the ac source 148 is supplied to the flap assembly. A bias or counter weight 149 keeps the flap 146 at a close proximity to a first capacitor plate 150 when the flow rate falls below a preset minimum value, whereat the first lead wire extending from the capacitor plate 150 supplies a command signal switching off the lowest low frequency bandpass filter or the minimum flow cut-off circuit. When the fluid dynamic drag force on the flap 146 pivots the flap 145 away from the capacitor plate 150 to a 45 degree position therefrom, the two lead wires respectively extending from the two capacitor plates 150 and 151 put out two command signals at about the same level which state of the command signal switches on the lowest low frequency bandpass filter. When the flow rate reaches an even higher level, the flap 146 becomes pivoted to a close proximity to the capacitor plate 151 and the lead wire extending therefrom puts out a command signal that switches on the next higher low frequency bandpass filter. The flow switch shown in FIGS. 12 or 13 is ideal to control the low frequency bandpass filters including a combination of only a lower and a higher low frequency filters, wherein the first flap separating away from the first capacitive proximity switch at a low flow rate switches on the lower low frequency bandpass filter, and the second flap approaching the second capacitive proximity switch switches on the higher low frequency filter.

Figure 14:
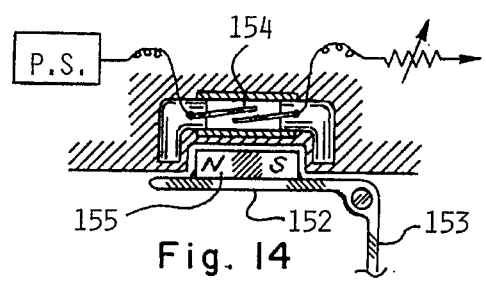
FIG. 14 illustrates a structural embodiment of the flow switch operating on principles of the reed switch.

In FIG. 14 there is illustrated a further embodiment of the flow switch having essentially the same construction and operating principles as those described in conjunction with FIG. 13. Each of the pair of flaps 152 and 153 activates each of the pair of magnetically controlled proximity switches such as the reed switch 154, that closes when the permanent magnet affixed to the flap 152 is at a close proximity thereto. The flow switch employing the magnetically controlled proximity switches can be applied to flows of electrically conductive fluid as well as nonconductive fluid, while the flow switch employing the capacitive proximity switches can be applied only to flows of electrically nonconductive fluid.

Figure 15:
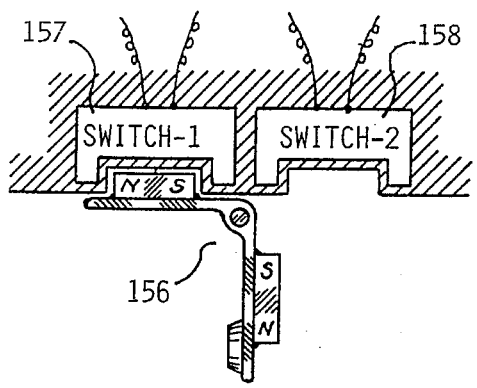
FIG. 15 illustrates a structural embodiment of the flow switch operating on principles of the electromagnetic proximity sensor.

In FIG. 15 there is illustrated a generalized version of the flow switch 156 employing a pair of inductive proximity switches 157 and 158, that operates on the same principles as those described in conjunction with FIGS. 12 and 13. Each of the pair of inductive proximity switches 157 and 158 closes when the magnet affixed to each of the pair of flaps becomes located to a close proximity thereto.

Figure 16:
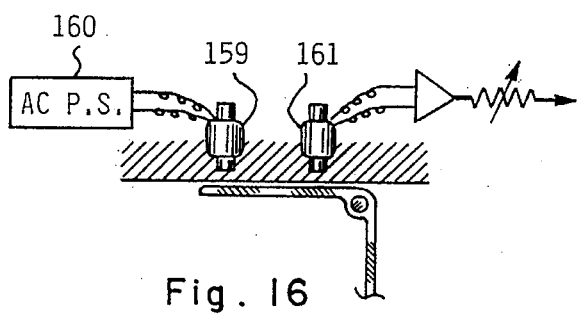
FIG. 16 illustrates a structural embodiment of the proximity type flow switch shown in FIG. 15.

In FIG. 16 there is illustrated a structural embodiment of the inductive proximity switch that can be employed in the construction of a flow switch that does not require any magnet. The first coil 159 energized by an ac source 160 transmits a command signal through the lead wire extending from the second coil 161 when each of the pair of flaps made of a ferro magnetic material comes to a close proximity to the inductive proximity switch.

Figure 17:
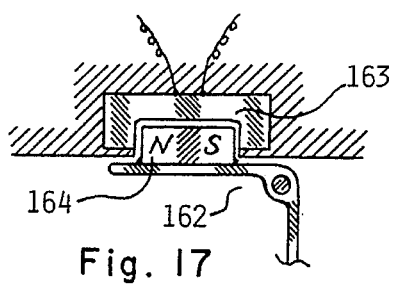
FIG. 17 illustrates another structural embodiment of the proximity type flow switch shown in FIG. 15.

FIG. 17 illustrates an embodiment of the flow switch 162 employing a pair of Hall effect proximity switches such as the element 163 that closes when it senses a preset level of magnetic field strength created by a permanent magnet 164. It should be understood that a flow switch operating on the principles similar to those of the flow switches shown and described in conjunction with FIGS. 12 through 17 may have a single flap that pivots over 180 degrees between the two proximity switches included next to the wall of the flow passage respectively on two opposite sides of a plane including the pivot axis and perpendicular to the wall of the flow passage.

Figure 18:
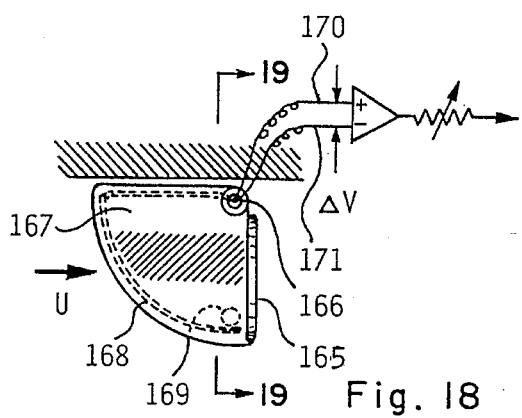
FIG. 18 illustrates a structural embodiment of a continuous position flow indicator providing the auxiliary flow signal.

In FIG. 18 there is illustrated an embodiment of a flow level sensor that can be used to generate the auxiliary flow signal controlling the low frequency bandpass filters included in the electronic filter with compound controls. A fluid dynamic target 165 receiving a drag force from the moving fluid media disposed pivotally about a pivot axis 166 includes a planar vane 167 of a quarter circle geometry, that is disposed on a plane parallel to the direction of the fluid flow. The hollow quarter circular perimeter of the vane includes a pair of elongated potentiometric wires 168 disposed coaxially to the pivot axis 166, wherein a metallic ball 169 rests at the lowest point on the pair of elongated potentiometric wires, which metallic ball establishes an electrical contact between the pair of elongated potentiometric wires. The ohmic resistance or voltage drop across two lead wires 170 and 171 respectively extending from the adjacent first extremities of the pair of elongated potentiometric wires is measured as a measure of the angular position of the fluid dynamic target about the pivot axis 166 that in turn represents the level of fluid flow. The command signal controlling the low frequency bandpass filters is generated from a dc voltage representing the ohmic resistance or voltage drop across the two lead wires 170 and 171. It is readily recognized that the flow level sensor such as the embodiment shown in FIG. 18, that provides an electrical signal continuously representing the flow rate of media, can be used to generate the command signal controlling the entire plurality of bandpass filters included in a parallel bank of filters without relying on any command signal generated from the frequency of the primary flow signal.

Figure 19:
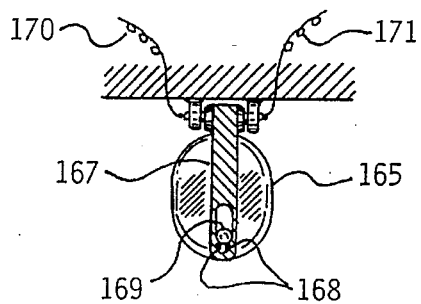
FIG. 19 illustrates a cross section of the flow indicator shown in FIG. 18.

In FIG. 19 there is illustrated a cross section of the flow level sensor shown in FIG. 18, which cross section taken along plane 19—19 as shown in FIG. 18 shows the metallic ball resting at the lowest point on the pair of elongated potentiometric wires 168.

Figure 20:
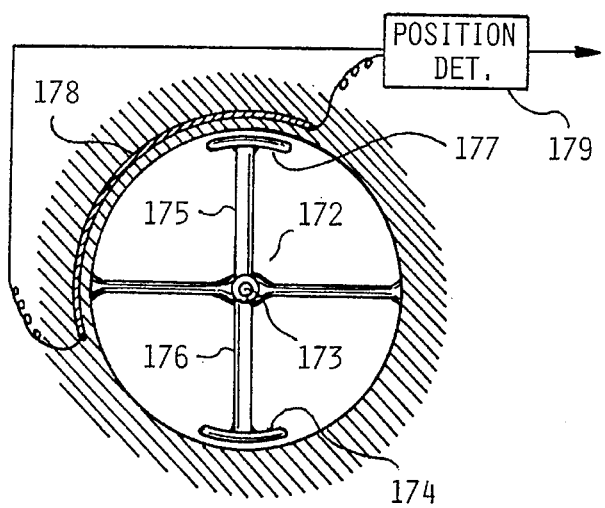
FIG. 20 illustrates another structural embodiment of a continuous position flow indicator providing the auxiliary flow signal.

In FIG. 20 there is illustrated another embodiment of the flow level sensor employing a fluid dynamic target 172 receiving a lift force from the moving fluid media, that is disposed pivotally about a pivot axis 173 parallel to the flow direction, wherein a counter balance or weight 174 affixed to the radial extremity of one of the two airfoil-like blades 175 and 176 provides a bias torque against the fluid dynamic torque experienced by the pair of blades 175 and 176. The radial extremity of the other of the pair of blades 175 and 176 includes a capacitive or inductive element 177 that electrically couples with an elongated electric circuit member 178 included in the wall of the flow passage in a coaxial relationship with respect to the pivot axis 175. A position detector 179 detecting the position of the capacitive or inductive element 177 relative to the elongated electric circuit member 178, generates the command signal controlling the switching of the low frequency bandpass filters or of the entire plurality of filters included in a parallel bank of filters.

Figure 21:
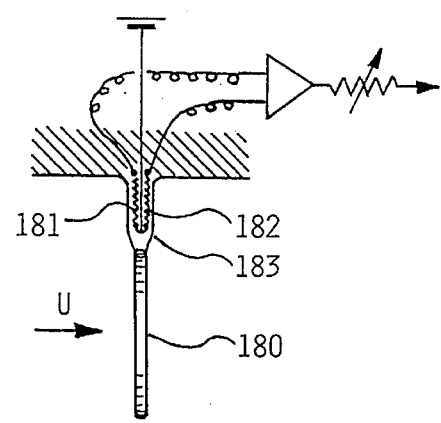
FIG. 21 illustrates a further structural embodiment of a flow indicator providing a continuous indication of the flow level.

In FIG. 21 there is illustrated an embodiment of the flow level sensor that generates the auxiliary flow signal representing the fluid dynamic drag experienced by a drag-type fluid dynamic target 180. The difference in the ohmic resistance between a pair of strain gauge wires 181 and 182 respectively affixed to the leading and trailing edges of the stem 183 of the drag plate 180 generates the auxiliary flow signal representing the magnitude of the fluid dynamic drag experienced by the drag plate 180, which auxiliary flow signal provides the command signal controlling the low frequency bandpass filters or the entire plurality of filters included in a parallel bank of filters.

Figure 22:
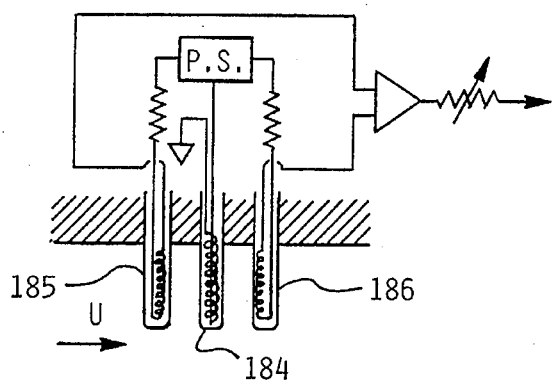
FIG. 22 illustrates a structural embodiment of a thermal flow indicator.

In FIG. 22 there is illustrated an embodiment of a thermal flow level sensor providing the auxiliary flow signal. A heating element 184 is disposed intermediate two temperature sensing elements 185 and 186, which elements are disposed on a plane parallel to the flow direction. The auxiliary flow signal represents the difference in the temperature between the two temperature sensing elements respectively located on the upstream and the downstream of the heating element 184, which temperature difference is proportional to the flow rate of fluid media.

Figure 23:
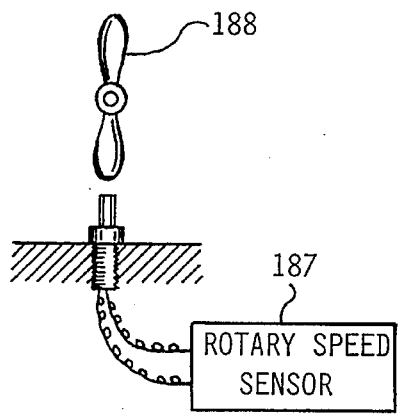
FIG. 23 illustrates a structural embodiment of a propeller or turbine type flow indicator providing the auxiliary flow signal.

In FIG. 23 there is illustrated an embodiment of the flow level sensor employing a fluid dynamic rotary member such as the well known turbine or propeller. The rotary speed sensor 187 provides the auxiliary flow signal representing the speed of rotation of the turbine or propeller 188, which auxiliary flow signal is not as accurate and as reliable as the vortex shedding frequency provided by the primary flow signal in representing the flow rate, but is more immune to the noise signal created by the mechanical vibrations of the flowmeter body compared with the primary flow signal generated by the vortex shedding from a bluff body. Therefore, it is logical to use the less accurate and more stable auxiliary flow signal generated by a turbine or propeller flowmeter to control the electronic filters conditioning the more accurate and much more sensitive primary flow signal generated by a vortex flowmeter.

Figure 24:
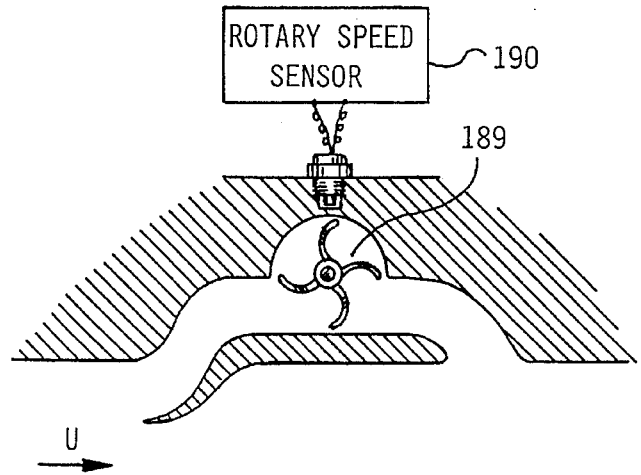
FIG. 24 illustrates a structural embodiment of a paddle type flow indicator providing the auxiliary flow signal.

FIG. 24 shows another embodiment of the flow level sensor employing a fluid dynamic rotary member. The paddle wheel flowmeter with a paddle wheel 189 and a rotary speed sensor 190 detecting the speed of rotation of the paddle wheel 189 is disposed within a secondary flow passage bifurcating from and merging with the main flow passage. The auxiliary flow signal provided by the paddle wheel flowmeter has the same characteristics as that of the auxiliary flow signal generated by a turbine or propeller flowmeter. In an alternative embodiment, the paddle wheel 189 may be disposed within the main flow passage. The structural embodiments of the flow switches and flow level sensors employing various versions of the proximity sensors, position sensors, and flow sensing devices and described in FIGS. 12 through 24 are merely a few examples of other known sensors and detectors which can be employed to generate the auxiliary flow signal that provides the command signal controlling the switching of the low frequency bandpass filters included in the electronic filter with compound controls or the switching of the entire plurality of filters included in a parallel bank of filters.

While the principles of the present inventions have now been made clear by the illustrative embodiments shown and described, there will be many modifications of the methods, structures, arrangements, properties, elements, and materials, which are immediately obvious to those skilled in the art and particularly adapted to the specific working environments and operating conditions in the practice of the inventions without departing from those principles. It is not desired to limit the inventions to the particular illustrative embodiments shown and described and accordingly all suitable modifications and equivalents may be regarded as falling within the scope of the inventions as defined by the claims which follow.

The embodiments of the inventions, in which an exclusive property or privilege is claimed, are defined as follows:

1. A method for conditioning a primary flow signal generated in a flowmeter, comprising in combination:

a) generating a primary flow signal from a fluid flow by using a primary flow measuring device, and supplying the primary flow signal to an electronic filter assembly including at least one electronic filter having an electronic switch, wherein said at least one electronic filter has a bandwidth and selectively transmits an alternating electrical signal with frequencies distributed substantially within the bandwidth of said at least one electronic filter;

b) generating an auxiliary flow signal from the fluid flow by using an accessory flow level detecting device;

c) generating a command signal from the auxiliary flow signal and sending the command signal to the electronic switch of said at least one electronic filter; wherein the command signal closes the electronic switch when the bandwidth of said at least one electronic filter substantially includes a frequency of the primary flow signal, and opens the electronic switch when the bandwidth of said at least one electronic filter substantially excludes the frequency of the primary flow signal; and d) obtaining a conditioned form of the primary flow signal from an output end of the electronic filter assembly as an alternating electrical signal representing the fluid flow.

2. A method as defined in claim 1 wherein an over-ride command signal backing up the command signal generated from the auxiliary flow signal in switching on and off said at least one electronic filter is generated when a level of the conditioned form of the primary flow signal is less than a preset value; wherein the over-ride command signal closes the electronic switch until the level of the conditioned form of the primary flow signal becomes greater than the preset value, and the over-ride command signal shuts off as soon as the level of the conditioned form of the primary flow signal becomes greater than the preset value.

3. A method as set forth in claim 2 wherein the over-ride command signal is generated when the level of the conditioned form of the primary flow signal is less than the preset value and a level of the primary flow signal supplied to the electronic filter assembly is greater than a preset value.

4. A method as defined in claim 1 wherein the electronic filter assembly includes a parallel combination of a plurality of electronic filters respectively having a plurality of electronic switches and respectively having different bandwidths; wherein each of the plurality of electronic filters selectively transmits an alternating electrical signal having frequencies distributed substantially within the bandwidth of said each electronic filter, and the command signal generated from the auxiliary flow signal closes one of the plurality of electronic switches belonging to one of the plurality of electronic filters having a bandwidth substantially including a frequency of the primary flow signal and opens said one electronic switch when the bandwidth of said one electronic filter substantially excludes the frequency of the primary flow signal.

5. A method as defined in claim 4 wherein an over-ride command signal backing up the command signal generated from the auxiliary flow signal in switching on and off the plurality of electronic filters is generated when a level of the conditioned form of the primary flow signal is less than a preset value; wherein the over-ride command signal switches on and off the plurality of electronic switches one at a time in a sweep mode until the level of the conditioned form of the primary flow signal becomes greater than the preset value, and the over-ride command signal shuts off as soon as the level of the conditioned form of the primary flow signal becomes greater than the preset value.

6. A method as defined in claim 5 wherein the over-ride command signal is generated when the level of the conditioned form of the primary flow signal is less than the preset value and the level of the primary flow signal supplied to the electronic filter assembly is greater than a preset value.

7. A method as defined in claim 4 wherein the command signal generated from the auxiliary flow signal opens all of the plurality of electronic switches when a level of the auxiliary flow signal is less than a preset minimum value.

8. A method as defined in claim 1 wherein the electronic filter assembly includes an additional parallel combination of a plurality of electronic filters respectively having a plurality of electronic switches and respectively having different bandwidths in a parallel relationship to said at least one electronic filter, wherein each of said plurality of electronic filters selectively transmits an alternating electrical signal having frequencies distributed substantially within the bandwidth of said electronic filter; and the method generates another command signal from frequency of the primary flow signal and sends said another command signal to said plurality of electronic switches, wherein said another command signal generated from the frequency of the primary flow signal closes one of said plurality of electronic switches belonging to one of said plurality of electronic filters having a band width substantially including a frequency of the primary flow signal and opens said one electronic switch when the band width of said one electronic filter substantially excludes the frequency of the primary flow signal.

9. A method as defined in claim 8 wherein an over-ride command signal backing up said a and another command signal in switching on and off said least one and said plurality of electronic filters is generated when a level of the conditioned form of the primary flow signal is less than a preset value; wherein the over-ride command signal switches on and off said at least one and said plurality of electronic switches one at a time in a sweep mode until the level of the conditioned form of the primary flow signal becomes greater than the preset value, and the over-ride command signal shuts off as soon as the level of the conditioned form of the primary flow signal becomes greater than the preset value.

10. A method as defined in claim 8 wherein said a command signal generated from the auxiliary flow signal and said another command signal generated from the frequency of the primary flow signal opens all of said at least one and said plurality of electronic switches when a level of the auxiliary flow signal is less than a preset minimum value.

11. An apparatus for generating and conditioning a primary flow signal representing a flow rate of fluid comprising in combination;
   a) an electronic filter assembly including at least one electronic filter having an electronic switch and a bandwidth, wherein said at least one electronic filter selectively transmits an alternating electrical signal with frequencies distributed substantially within the bandwidth of said at least one electronic filter;
   b) a principal flow rate measuring device generating a primary flow signal supplied to an input end of the electronic filter assembly;
   c) an accessory flow level detecting device generating an auxiliary flow signal;
   d) means for generating a command signal from the auxiliary flow signal and sending the command signal to the electronic switch of said at least one electronic filter; wherein the command signal closes the electronic switch when the bandwidth of said at least one electronic filter substantially includes a frequency of the primary flow signal, and opens the electronic switch when the bandwidth of said at least one electronic filter substantially excludes the frequency of the primary flow signal; and
   e) means for obtaining a conditioned form of the primary flow signal from a output end of the electronic filter assembly as an alternating electrical signal representing the fluid flow.

12. An apparatus as defined in claim 11 including means for generating an over-ride command signal backing up the command signal generated from the auxiliary flow signal in switching on and off said at least one electronic filter when a level of the conditioned form of the primary flow signal is less than a preset value; wherein the over-ride command signal closes the electronic switch until the level of the conditioned form of the primary flow signal becomes greater than the preset value, and the over-ride command signal shuts off as soon as the level of the conditioned form of the primary flow signal becomes greater than the preset value.

13. An apparatus as defined in claim 12 wherein said means for generating the over-ride command signal generates the over-ride command signal when the level of the conditioned form of the primary flow signal is less than the preset value and a level of the primary flow signal supplied to the electronic filter assembly is greater than a preset value.

14. An apparatus as defined in claim 11 wherein the electronic filter assembly includes a parallel combination of a plurality of electronic filters respectively having a plurality of electronic switches and respectively having different bandwidths; wherein each of the plurality of electronic filters selectively transmits an alternating electrical signal having frequencies distributed substantially within the bandwidth of said each electronic filter, and the command signal generated from the auxiliary flow signal closes one of the plurality of electronic switches belonging to one of the plurality of electronic filters having a bandwidth substantially including a frequency of the primary flow signal and opens said one electronic switch when the bandwidth of said one electronic filter substantially excludes the frequency of the primary flow signal.

15. An apparatus as defined in claim 14 including means for generating an over-ride command signal backing up the command signal generated from the auxiliary flow signal in switching on and off the plurality of electronic filters when a level of the conditioned form of the primary flow signal is less than a preset value; wherein the over-ride command signal switches on and off the plurality of electronic switches one at a time in a sweep mode until the level of the conditioned form of the primary flow signal becomes greater than the preset value, and the over-ride command signal shuts off as soon as the level of the conditioned form of the primary flow signal becomes greater than the preset value.

16. An apparatus as defined in claim 15 wherein said means for generating the over-ride command signal generates the over-ride command signal when the level of the conditioned form of the primary flow signal is less than the preset value and a level of the primary flow signal supplied to the electronic filter assembly is greater than a preset value.

17. An apparatus as defined in claim 14 wherein the command signal generated from the auxiliary flow signal opens all of the plurality of electronic switches when a level of the auxiliary flow signal is less than a preset minimum value.

18. An apparatus as defined in claim 11 wherein the electronic filter assembly includes an additional parallel combination of a plurality of electronic filters respectively having a plurality of electronic switches and respectively having different bandwidths in a parallel relationship to said at least one electronic filter, wherein each of said another plurality of electronic filters selectively transmits an alternating electrical signal having frequencies distributed substantially within the bandwidth of said electronic filter; and the apparatus includes means for generating another command signal from frequency of the primary flow signal and sends said another command signal to said another plurality of electronic switches, wherein said another command signal closes one of said another plurality of electronic switches belonging to one of said another plurality of electronic filters having a bandwidth substantially including a frequency of the primary flow signal and opens said one electronic switch when the bandwidth of said one electronic filter substantially excludes the frequency of the primary flow signal.

19. An apparatus as defined in claim 18 including means for generating an over-ride command signal backing up said a and another command signal in switching on and off said at least one and said plurality of electronic filters when a level of the conditioned form of the primary flow sigal is less than a preset value; wherein the over-ride command signal switches on and off said at least one and said plurality of electronic switches one at a time in a sweep mode until the level of the conditioned form of the primary flow signal becomes greater than the preset value, and the over-ride command signal shuts off as soon as the level of the conditioned form of the primary flow signal becomes greater than the preset value.

20. An apparatus as defined in claim 18 wherein said a command signal generated from the auxiliary flow signal and said another command signal generated from the frequency of the primary flow signal open all of said at least one and said plurality of electronic switches when a level of the auxiliary flow signal is less than a preset minimum value.

* * * * *